United States Patent
Seo et al.

(10) Patent No.: US 12,499,930 B2
(45) Date of Patent: Dec. 16, 2025

(54) SENSE AMPLIFIER, OPERATING METHOD THEREOF, AND VOLATILE MEMORY DEVICE INCLUDING THE SAME

(71) Applicant: SAMSUNG ELECTRONICS CO., LTD., Suwon-si (KR)

(72) Inventors: Duckyoung Seo, Suwon-si (KR); Younghun Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 18/142,854

(22) Filed: May 3, 2023

(65) Prior Publication Data

US 2024/0105254 A1    Mar. 28, 2024

(30) Foreign Application Priority Data

Sep. 23, 2022  (KR) .......................... 10-2022-0120872

(51) Int. Cl.
*G11C 11/4091*   (2006.01)
*G11C 11/4097*   (2006.01)

(52) U.S. Cl.
CPC ...... *G11C 11/4091* (2013.01); *G11C 11/4097* (2013.01)

(58) Field of Classification Search
CPC ................. G11C 7/12; G11C 7/06; G11C 7/10
See application file for complete search history.

(56) References Cited

U.S. PATENT DOCUMENTS

| | | |
|---|---|---|
| 7,227,798 B2 | 6/2007 | Gupta et al. |
| 7,733,727 B2 | 6/2010 | Hwang et al. |
| 8,009,494 B2 | 8/2011 | Chang |
| 9,509,255 B2 | 11/2016 | Upputuri et al. |
| 10,074,408 B2 * | 9/2018 | Seo ............... G11C 11/4091 |
| 10,127,959 B2 | 11/2018 | Dray et al. |
| 10,497,428 B2 | 12/2019 | Kim et al. |
| 2018/0096713 A1 * | 4/2018 | Chandra ........... G01R 19/165 |

FOREIGN PATENT DOCUMENTS

| | | |
|---|---|---|
| KR | 10-2005-0039266 A | 4/2005 |
| KR | 10-0912967 B1 | 8/2009 |
| KR | 10-0924206 B1 | 10/2009 |
| KR | 10-1543327 B1 | 8/2015 |

* cited by examiner

*Primary Examiner* — Hoai V Ho
*Assistant Examiner* — Anthony Thinh Tang
(74) *Attorney, Agent, or Firm* — Sughrue Mion, PLLC

(57) ABSTRACT

Disclosed is a sense amplifier which includes a sense amplification circuit and a sensitivity control circuit. The sense amplification circuit includes first and second MOS transistors. The first MOS transistor is connected with a first bit line and a target memory cell. The second MOS transistor is connected with a second bit line and a non-target memory cell. The sense amplification circuit pre-charges the first and second bit lines with a first driving voltage, compensates for an offset, and senses the target data based on a change in a voltage level of the first bit line, after charge sharing between the target memory cell and the first bit line. The sensitivity control circuit adjusts the sensing sensitivity for the target data indicating a first logical value by increasing a magnitude of a current flowing through the first MOS transistor while the sense amplification circuit senses the target data.

18 Claims, 21 Drawing Sheets

| TARGET MEMORY CELL | SCTL1 | SCTL2 |
|---|---|---|
| BL side | 1.4V | 0.9V |
| BLB side | 0.9V | 1.4V |

FIG. 11

| TARGET MEMORY CELL | SCTL1 | SCTL2 |
|---|---|---|
| BL side | 1.4V<br>(Turn-on) | 0V<br>(Turn-off) |
| BLB side | 0V<br>(Turn-off) | 1.4V<br>(Turn-on) |

| TARGET MEMORY CELL | SCTL1 | SCTL2 |
|---|---|---|
| BL side | 1.4V (Turn-on) | 0V (Turn-off) |
| BLB side | 0V (Turn-off) | 1.4V (Turn-on) |

SENSE AMPLIFIER, OPERATING METHOD THEREOF, AND VOLATILE MEMORY DEVICE INCLUDING THE SAME

CROSS-REFERENCE TO RELATED APPLICATION

This application claims priority under 35 U.S.C. § 119 to Korean Patent Application No. 10-2022-0120872 filed on Sep. 23, 2022, in the Korean Intellectual Property Office, the disclosure of which is incorporated by reference herein in its entirety.

BACKGROUND

Embodiments of the present disclosure described herein relate to a semiconductor device, and more particularly, relate to a sense amplifier, an operating method of the sense amplifier, and a volatile memory device including the sense amplifier.

A volatile memory device loses data stored therein when power to the volatile memory device is turned off. However, a volatile memory device has a higher speed than a non-volatile memory device. The volatile memory device includes a dynamic random access memory (DRAM), a static RAM (SRAM), a synchronous DRAM (SDRAM), etc.

Currently, methods to increase a threshold voltage and to decrease a driving voltage are used to reduce a leakage current. The leakage current occurs due to process miniaturization of the DRAM and power consumption of the DRAM. Based on these methods, it is difficult to secure sufficient memory timing (e.g., tRCD) or to satisfy various parameter characteristics of the DRAM. To solve the above issue, a method (e.g., a full VDDNSS bitline pre-charge (FVBP) method) to pre-charge bit lines with the driving voltage of the DRAM during a read operation or a refresh operation of the DRAM has been applied to the DRAM. However, in the case of the DRAM to which the FVBP method is applied, the sensitivity of sensing for data having a specific logical value (e.g., a logic value of "1" when a bit line is pre-charged with VDD; a logical value of "0" when a bit line is pre-charged with VSS) is reduced. In this case, an offset between circuit elements included in a sense amplifier causes an increase in the probability that a sensing error is caused by the reduction of the sensing sensitivity of target data.

SUMMARY

Embodiments of the present disclosure provide a sense amplifier capable of compensating for an offset and improving the sensitivity of sensing, in a volatile memory to which a FVBP (Full VDD/VSS Bitline Pre-charge) method is applied.

Embodiments of the present disclosure provide an operating method of the sense amplifier.

Embodiments of the present disclosure provide a volatile memory device including the sense amplifier.

According to one or more embodiments, a sense amplifier comprises: a sense amplification circuit including a first MOS transistor connected with a first bit line and a second MOS transistor connected with a second bit line, the first bit line connected with a target memory cell among memory cells, the second bit line connected to a non-target memory cell among the memory cells; and a sensitivity control circuit configured to control sensing sensitivity for target data stored in the target memory cell, wherein the sense amplification circuit is configured to: pre-charge the first and second bit lines with a first driving voltage being one of driving voltages; compensate for an offset between the first and second MOS transistors; perform a sense operation in which the target data based on a change in a voltage level of the first bit line is sensed, and wherein the sensitivity control circuit is configured to: adjust the sensing sensitivity for the target data indicating a first logical value by increasing a magnitude of a current flowing through the first MOS transistor during the sense operation.

According to one or more embodiments, an operating method of a sense amplifier, the method comprising: performing a pre-charge operation such that a first bit line and a second bit line are pre-charged with a first driving voltage being one of driving voltages, wherein the first bit line is connected with a target memory cell among memory cells and the second bit line is complementary to the first bit line and is connected to a non-target memory cell among the memory cells; performing an offset compensation operation such that an offset between a first MOS transistor and a second MOS transistor is compensated, wherein a gate terminal of the first MOS transistor is connected with the first bit line and a gate terminal of the second MOS transistor is connected with the second bit line; performing a sensitivity control operation such that sensing sensitivity for target data indicating a first logical value stored in the target memory cell is adjusted, wherein the adjusting the sensing sensitivity includes increasing a magnitude of a current flowing through the first MOS transistor; and performing a pre-sensing operation such that the target data are sensed by using the first MOS transistor.

According to one or more embodiments, a memory device comprising: memory cells including a target memory cell and a non-target memory cell; a first bit line connected with the target memory cell; a second bit line being complementary to the first bit line and connected with the non-target memory cell; and a sense amplifier configured to sense target data stored in the target memory cell, wherein the sense amplifier includes: a sense amplification circuit including a first MOS transistor connected with the first bit line and a second MOS transistor connected with the second bit line; and a sensitivity control circuit configured to control sensing sensitivity for the target data, wherein the sense amplification circuit is configured to: pre-charge the first and second bit lines with a first driving voltage being one of driving voltages, compensate for an offset between the first and second MOS transistors, perform sense operation in which target data based on a change in a voltage level of the first bit line is sensed, and wherein the sensitivity control circuit is configured to: adjust the sensing sensitivity for the target data indicating a first logical value by increasing a magnitude of a current flowing through the first MOS transistor while the sense amplification circuit senses the target data.

BRIEF DESCRIPTION OF DRAWINGS

The above and other objects and features of the present disclosure will become apparent by describing in detail embodiments thereof with reference to the accompanying drawings.

FIG. 11 is a diagram for describing control signals provided to sense amplifiers of FIGS. 10A and 10B, according to one or more embodiments of the present disclosure.

FIG. 13 is a flowchart for describing operations of sense amplifiers of FIGS. 12A and 12B, according to one or more embodiments of the present disclosure.

FIG. 14 is a diagram for describing control signals provided to sense amplifiers of FIGS. 12A and 12B, according to one or more embodiments of the present disclosure.

DETAILED DESCRIPTION

Below, embodiments of the present disclosure will be described in detail and clearly to such an extent that one skilled in the art easily carries out the present disclosure.

Figure 1:
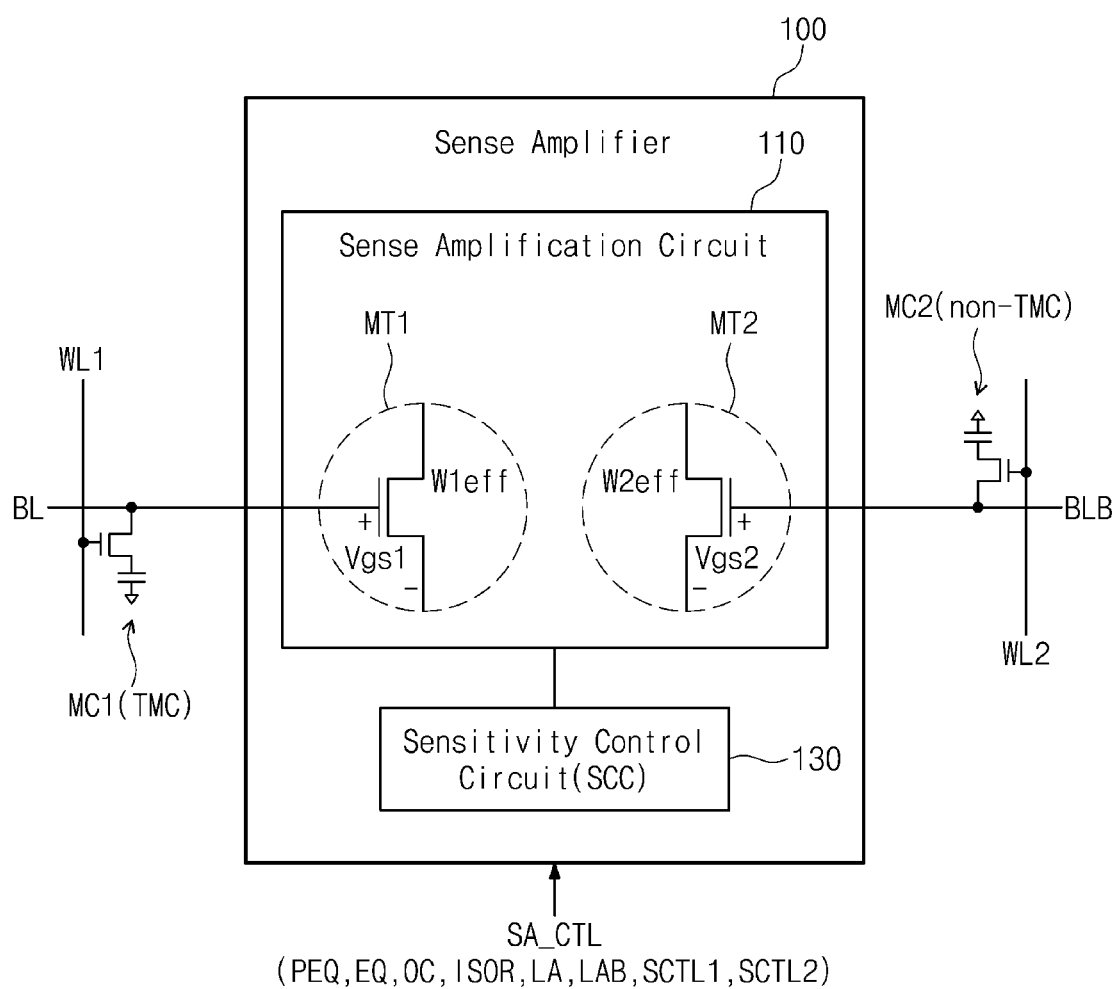
FIG. 1 is a block diagram illustrating a sense amplifier according to one or more embodiments of the present disclosure.
Figure 2:
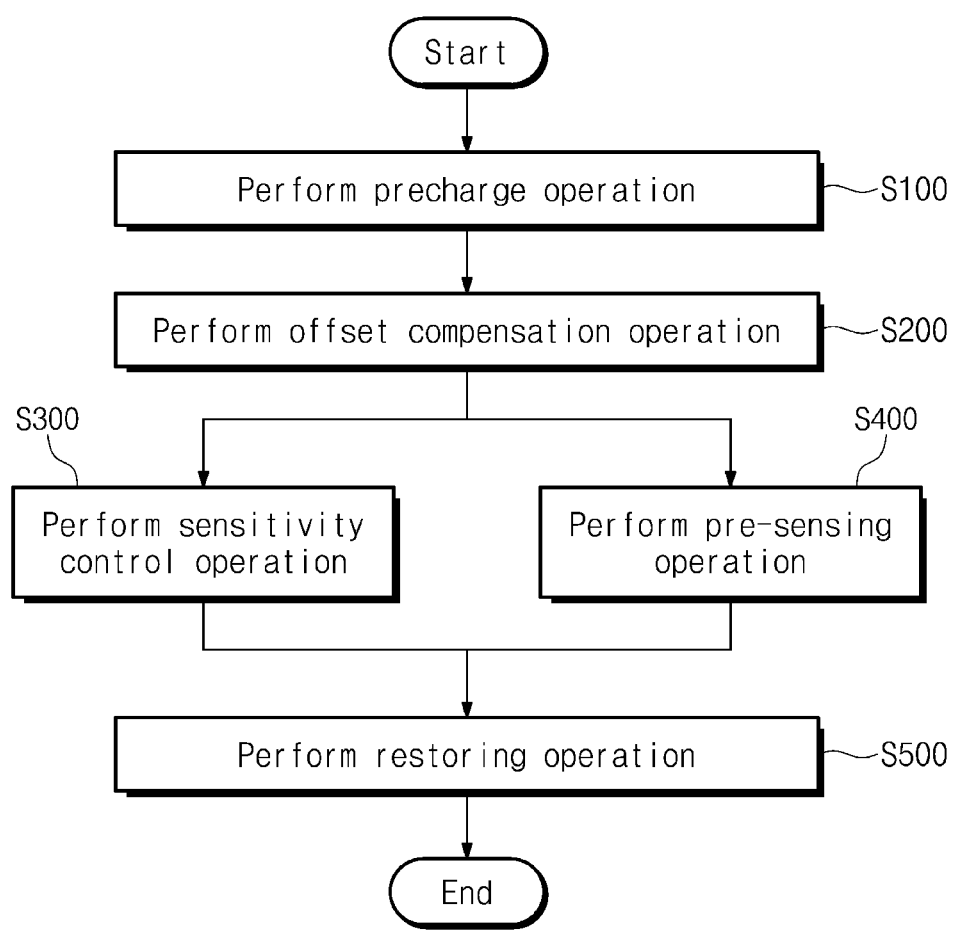
FIG. 2 is a flowchart illustrating an operating method of a sense amplifier according to one or more embodiments of the present disclosure.

FIG. 1 is a block diagram illustrating a sense amplifier, according to one or more embodiments of the present disclosure. FIG. 2 is a flowchart illustrating an operating method of a sense amplifier, according to one or more embodiments of the present disclosure.

Referring to FIG. 1, a sense amplifier 100 may be electrically connected with bit lines of a volatile memory device, and may sense and amplify data stored in a plurality of memory cells of the volatile memory device based on a voltage difference of two complementary bit lines from among the bit lines during the read operation or the refresh operation of the volatile memory device.

In one or more embodiments, the sense amplifier 100 may be connected with a first bit line BL and a second bit line BLB that are complementary to each other. When the first bit line BL is referred to as a "bit line", the second bit line BLB may be referred to as a "complementary bit line".

In one or more embodiments, the volatile memory device may include a memory cell array including the plurality of memory cells, and the plurality of memory cells may be connected with the first bit line BL and the second bit line BLB.

While the read operation or the refresh operation is performed on memory cells connected with the first bit line BL from among the plurality of memory cells, the read operation or the refresh operation may not be performed on memory cells connected with the second bit line BLB that is complementary to the first bit line BL. In this case, only some of the memory cells connected with the first bit line BL and the memory cells connected with the second bit line BLB may be selected by voltages applied to word lines WL1 and WL2. An example in which one memory cell (e.g., a first memory cell MC1 or a second memory cell MC2) is connected with each of the first bit line BL and the second bit line BLB is illustrated in FIG. 1, however, this configuration is merely an example, and the present disclosure is not limited thereto. For example, a plurality of memory cells may be connected with each of the first bit line BL and the second bit line BLB.

Below, in one or more examples, the description will be given under the condition that the first memory cell MC1 connected with the first bit line BL is targeted for the read operation or the refresh operation. In this case, the first memory cell MC1 may be referred to as "target memory cell" (TMC), and the second memory cell MC2 connected with the second bit line BLB that is complementary to the first bit line BL may be referred to as "non-target memory cell" (non-TMC).

The sense amplifier 100 may include a sense amplification circuit 110 and a sensitivity control circuit 130. The sense amplification circuit 110 may include a first MOS transistor MT1 and a second MOS transistor MT2. The first MOS transistor MT1 may be connected with the first bit line BL, the second MOS transistor MT2 may be connected with the second bit line BLB, and the sensitivity control circuit 130 may control the sensitivity of sensing of target data stored in the target memory cell TMC.

In one or more embodiments, the sense amplification circuit 110 may include a plurality of MOS transistors including the first MOS transistor MT1 and the second MOS transistor MT2. The first MOS transistor MT1 may include a gate terminal connected with the first bit line BL, and the second MOS transistor MT2 may include a gate terminal connected with the second bit line BLB. A configuration of the sense amplifier 100 and the sense amplification circuit 110 will be described with reference to FIGS. 3A and 3B.

In one or more embodiments, the sense amplifier 100 may perform a pre-charge operation, a pre-sensing operation, and a restoring operation. The sense amplifier 100 may further perform an offset compensation operation and a sensitivity control operation.

Referring to FIGS. 1 and 2, the sense amplifier 100 may sequentially perform the pre-charge operation, the offset compensation operation, the sensitivity control operation, the pre-sensing operation, and the restoring operation (S100, S200, S300, S400, and S500). In one or more examples, each of these operations may be sequentially performed. However, as understood by one of ordinary skill in the art, one or more of these operations may be started before a prior operation is completed.

In one or more embodiments, while performing the pre-charge operation (S100), based on the FVBP method, the sense amplifier 100 may charge the first bit line BL and the second bit line BLB with a first driving voltage being one of driving voltages of the volatile memory device. For example, the first driving voltage may be one of VDD and VSS, but the present disclosure is not limited thereto. After operation S100, while performing the offset compensation operation (S200), the sense amplifier 100 may compensate for an offset between the first MOS transistor MT1 and the second MOS transistor MT2.

In one or more embodiments, after operation S200 and after a charge sharing operation between the first memory cell MC1 and the first bit line BL is performed, while performing the sensitivity control operation (S300), the sense amplifier 100 may increase the sensing sensitivity of the first MOS transistor MT1 for target data indicating a first logical value by increasing a magnitude of a current flowing to the first MOS transistor MT1.

For example, the first logical value may correspond to the first driving voltage associated with the charging of the first and second bit lines BL and BLB in the pre-charge operation (S100). When the first driving voltage is VDD, the first logical value may be a logical value of "1"; when the first driving voltage is VSS, the first logical value may be a logical value of "0".

For example, in operation S300, the sense amplifier 100 may control gate-source voltages Vgs1 and Vgs2 of the first and second MOS transistors MT1 and MT2, respectively, to be different from each other, and may control effective channel widths W1$eff$ and W2$eff$ of the first and second MOS transistors MT1 and MT2 to be different from each other.

For example, in operation S300, the sense amplifier 100 may increase the sensing sensitivity of the first MOS transistor MT1 for the first logical value by increasing only the gate-source voltage of the first MOS transistor MT1. In operation S300, the sense amplifier 100 may increase the sensing sensitivity of the first MOS transistor MT1 for the first logical value by increasing only the effective channel width W1$eff$ of the first MOS transistor MT1.

In one or more embodiments, after operation S200 and while performing the pre-sensing operation (S400), the sense amplifier 100 may sense the target data by using the first MOS transistor MT1 having the increased sensing sensitivity. After operation S300 or S400, the sense amplifier 100 may perform the restoring operation on the first memory cell MC1 such that the data of the first memory cell MC1 are restored (S500).

In one or more embodiments, the sense amplifier 100 may receive a sense amplifier control signal SA_CTL including control signals PEQ, EQ, OC, ISOR, LA, LAB, SCTL1, and SCTL2 from the outside, and may sequentially perform the pre-charge operation, the offset compensation operation, the pre-sensing operation, and the restoring operation based on the sense amplifier control signal SA_CTL. For example, while the sense amplifier 100 performs the above operations, signals whose voltage levels are determined in advance may be applied to nodes included in the sense amplifier 100, based on the control signals LA and LAB. For example, while the sense amplifier 100 performs the above operations, some or all of MOS transistors included in the sense amplifier 100 may be turned on/off based on the control signals PEQ, EQ, OC, ISOR, SCTL1, and SCTL2. The above operations that the sense amplifier 100 performs will be described with reference to FIGS. 4, 5A, 5B, 5C, 5D, and 5E.

Through the above configuration, the sense amplifier, according to one or more embodiments of the present disclosure, may perform the pre-charge operation complying with the FVBP method, by charging the first and second bit lines with the first driving voltage being one of the driving voltages of the volatile memory device during the pre-charge operation. The sense amplifier may compensate for the offset between the first and second MOS transistors included in the sense amplifier during the offset compensation operation. The sense amplifier may increase the sensing sensitivity of the first MOS transistor for data indicating the first logical value during the sensitivity control operation, and may sense data stored in the target memory cell by using the first MOS transistor with the increased sensing sensitivity during the pre-sensing operation. Accordingly, in the volatile memory device to which the FVBP method is applied, the reduction of the sensing sensitivity for data having a specific logical value may be efficiently prevented, while compensating for the offset between circuit elements included in the sense amplifier.

Figure 3A:
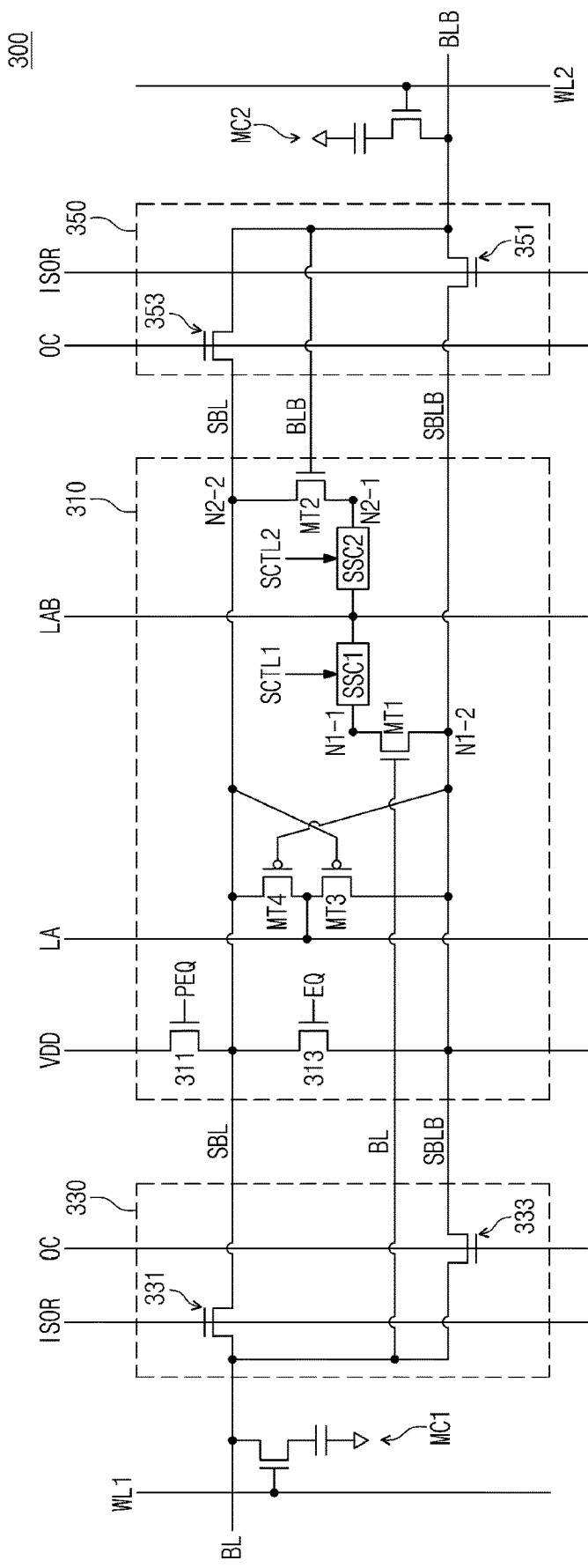
FIGS. 3A and 3B are circuit diagrams illustrating a sense amplifier of FIG. 1, according to one or more embodiments of the present disclosure.
Figure 3B:
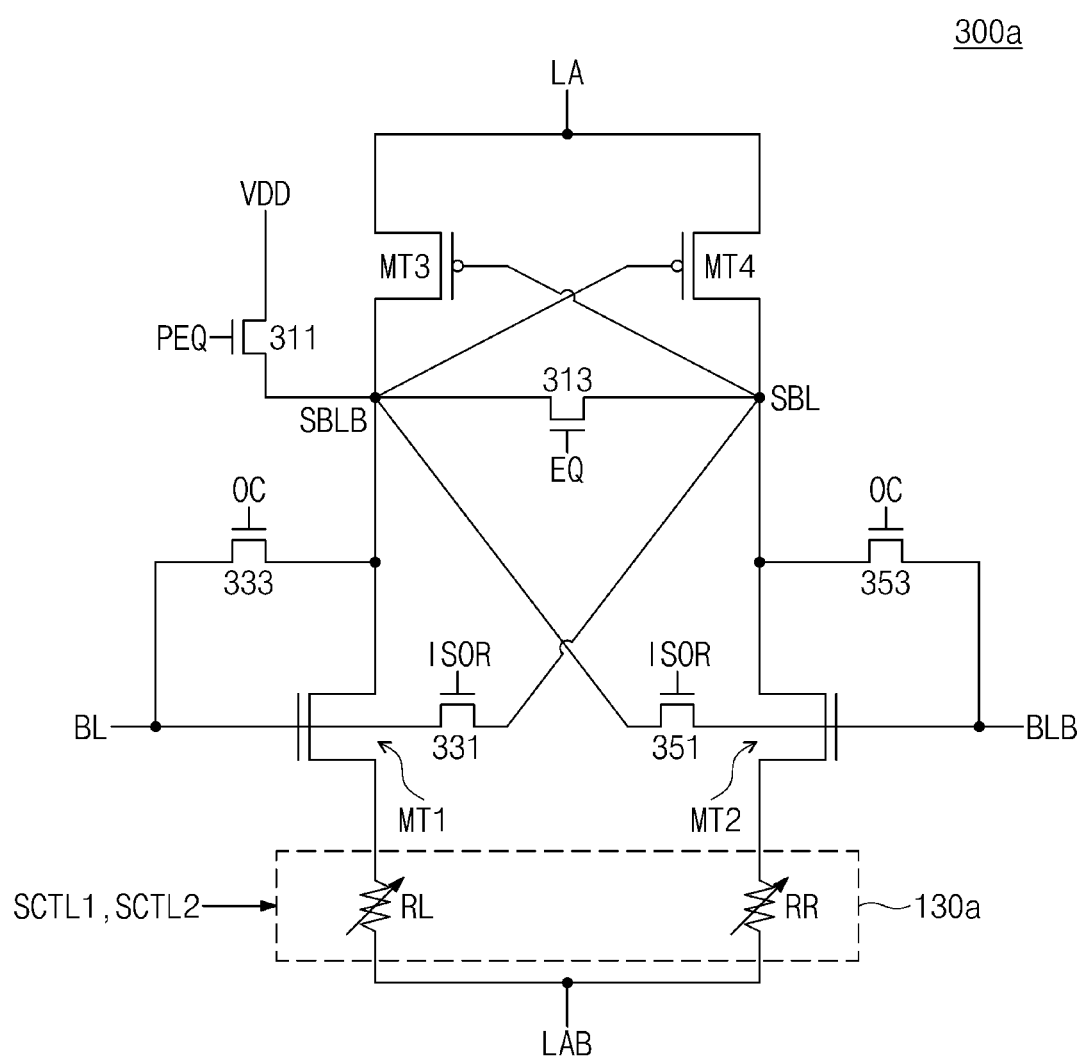

FIGS. 3A and 3B are circuit diagrams illustrating a sense amplifier of FIG. 1.

Referring to FIGS. 1 and 3A, a sense amplifier 300 may correspond to the sense amplifier 100 illustrated in FIG. 1. In FIGS. 1 and 3A, components that are marked by the same reference numerals/signs may perform substantially the same function. The control signals PEQ, EQ, OC, ISOR, LA, LAB, SCTL1, and SCTL2 may include the first and second equalization signals PEQ and EQ, the offset compensation signal OC, the isolation release signal ISOR, the first and second power signals LA and LAB, and the first and second sensitivity control signals SCTL1 and SCTL2. The control signals PEQ, EQ, OC, ISOR, LA, LAB, SCTL1, and SCTL2 may be included in the sense amplifier control signal SA_CTL of FIG. 1. The first memory cell MC1 may be the target memory cell (TMC), and the second memory cell MC2 may be the non-target memory cell (non-TMC).

The sense amplifier 300 may include a sense amplification circuit (e.g., 110 of FIG. 1), and the sense amplification circuit may include an amplification unit 310, a first isolation/offset compensation control circuit 330, and a second isolation/offset compensation control circuit 350.

The amplification unit 310 may include n-type metal oxide semiconductor (NMOS) transistors MT1 and MT2 and p-type metal oxide semiconductor (PMOS) transistors MT3 and MT4. The first isolation/offset compensation control circuit 330 may include NMOS transistors 331 and 333, and the second isolation/offset compensation control circuit 350 may include NMOS transistors 351 and 353.

In one or more embodiments, the amplification unit 310 may include the first MOS transistor MT1, the second MOS transistor MT2, the third MOS transistor MT3, and the fourth MOS transistor MT4, and may further include a first equalization transistor 311 and a second equalization transistor 313.

For example, the first MOS transistor MT1 may include a gate terminal connected with the first bit line BL and may be connected between a node N1-1 and a node N1-2 corresponding to a second sensing bit line SBLB. The second MOS transistor MT2 may include a gate terminal connected with the second bit line BLB and may be connected between a node N2-1 and a node N2-2 corresponding to a first sensing bit line SBL.

As illustrated in FIG. 3A, terminals of MT3 and MT4 are connected with each other. The third MOS transistor MT3 may include a gate terminal connected with the node N2-2 and may be connected between a first power node to which the first power signal LA is applied and the node N1-2. The fourth MOS transistor MT4 may include a gate terminal connected with the node N1-2 and may be connected between the node N2-2 and the first power node.

In one or more examples, a first sub sensitivity control circuit SSC1 may be connected between the node N1-1 and a second power node to which the second power signal LAB is applied, and a second sub sensitivity control circuit SSC2 may be connected between the node N2-1 and the second power node.

In one or more examples, the first equalization transistor 311 may include a gate terminal that receives the first equalization signal PEQ and may be connected between a third power node to which the third power signal VDD is applied and the node N2-2. The second equalization transistor 313 may include a gate terminal that receives the second equalization signal EQ and may be connected between the node N1-2 and the node N2-2.

In one or more embodiments, the first isolation/offset compensation control circuit 330 may include the first isolation transistor 331 and the first offset compensation transistor 333, and the second isolation/offset compensation control circuit 350 may include the second isolation transistor 351 and the second offset compensation transistor 353.

In one or more examples, the first isolation transistor 331 may include a gate terminal that receives the isolation release signal ISOR and may be connected between the first bit line BL and the node N2-2, and the first offset compensation transistor 333 may include a gate terminal that receives the offset compensation signal OC and may be connected between the first bit line BL and the node N1-2.

In one or more examples, the second isolation transistor 351 may include a gate terminal that receives the isolation release signal ISOR and may be connected between the second bit line BLB and the node N1-2, and the second offset compensation transistor 353 may include a gate terminal that receives the offset compensation signal OC and may be connected between with the second bit line BLB and the node N2-2.

In one or more embodiments, the amplification unit 310 may include a first amplification circuit, a second amplification circuit, an offset compensation circuit, and an isolation circuit, and may further include a pre-charge circuit.

In one or more examples, the first amplification circuit may include the third MOS transistor MT3 and the fourth MOS transistor MT4, and may pre-charge the first sensing bit line SBL, the second sensing bit line SBLB, the first bit line BL, and the second bit line BLB with the first driving voltage based on the first power signal LA from the first power node.

In one or more examples, the second amplification circuit may include the first MOS transistor MT1 and the second MOS transistor MT2 and may sense the target data based on a change in the voltage level of the first bit line BL.

In one or more examples, the offset compensation circuit may include the first offset compensation transistor 333 and the second offset compensation transistor 353. Based on the offset compensation signal OC being applied to the first offset compensation transistor 333, the offset compensation circuit may connect the first sensing bit line SBL and the second bit line BLB and may connect the second sensing bit line SBLB and the first bit line BL.

In one or more examples, the isolation circuit may include the first isolation transistor 331 and the second isolation transistor 351. Based on the isolation release signal ISOR being applied to a gate of the second isolation transistor 351, the isolation circuit may connect the first sensing bit line SBL and the first bit line BL and may connect the second sensing bit line SBLB and the second bit line BLB.

In one or more examples, the pre-charge circuit may include the first equalization transistor 311 and the second equalization transistor 313. Based on the first equalization signal PEQ being applied to a gate of the first equalization transistor 311 and the second equalization signal EQ being applied to a gate of the second equalization transistor 313, the pre-charge circuit may equalize the voltage level of the first sensing bit line SBL and the voltage level of the second sensing bit line SBLB.

The sense amplifier 300 may further include a sensitivity control circuit (e.g., 130 of FIG. 1), and the sensitivity control circuit may include the first sub sensitivity control circuit SSC1 and the second sub sensitivity control circuit SSC2. The first sub sensitivity control circuit SSC1 may be controlled based on the first sensitivity control signal SCTL1, and the second sub sensitivity control circuit SSC2 may be controlled based on the second sensitivity control signal SCTL2.

In one or more embodiments, the sensitivity control circuit may be connected between the amplification unit 310 and the second power node to which the second power signal LAB is applied. As understood by one of ordinary skill in the art, this configuration is merely an example, and the present disclosure is not limited thereto.

FIG. 3B illustrates a sense amplifier 300A. Referring to FIGS. 3A and 3B, the sense amplifier 300a may be an equivalent circuit of the sense amplifier 300. In FIGS. 3A and 3B, components that are marked by the same reference numerals/signs may perform substantially the same function. The sense amplifier 300a may include a sense amplification circuit (e.g., 110 of FIG. 1). The sense amplification circuit may include the first to fourth MOS transistors MT1 to MT4, the first and second equalization transistors 311 and 313, the first and second isolation transistors 331 and 351, and the first and second offset compensation transistors 333 and 353.

The sense amplifier 300a may include a sensitivity control circuit 130a. The sensitivity control circuit 130a may correspond to the sensitivity control circuit 130 of FIG. 1, and may correspond to the first and second sub sensitivity control circuits SSC1 and SSC2 of FIG. 3A.

In one or more embodiments, the sensitivity control circuit 130a may include a first variable resistor RL and a second variable resistor RR. The first variable resistor RL may be connected between a source terminal of the first MOS transistor MT1 and the second power node to which the second power signal LAB is applied, and the second variable resistor RR may be connected between a source terminal of the second MOS transistor MT2 and the second power node. Based on this configuration, after performance of the charge sharing, described with reference to FIGS. 1 and 2, the sense amplifier 300a may advantageously increase the sensing sensitivity of the first MOS transistor MT1 by decreasing only a resistance value of the first variable resistor RL based on the first and second sensitivity control signals SCTL1 and SCTL2. As understood by one of ordinary skill in the art, this configuration is merely an example, and the present disclosure is not limited thereto.

The first sensing bit line SBL and the second sensing bit line SBLB of FIG. 3A may be expressed by nodes in FIG. 3B. A node corresponding to the first sensing bit line SBL of FIG. 3A may be referred to as a "first internal node," and a node corresponding to the second sensing bit line SBLB of FIG. 3A may be referred to as a "second internal node."

In one or more embodiments, the fourth MOS transistor MT4 may be connected between the first power node, to which the first power signal LA is applied, and the first internal node (SBL), and the third MOS transistor MT3 may be connected between the first power node and the second internal node. The first internal node may be connected with a drain terminal of the second MOS transistor MT2, and the second internal node may be connected with a drain terminal of the first MOS transistor MT1. Gate terminals of the third MOS transistor MT3 and the fourth MOS transistor MT4 may be cross coupled to the first internal node and the second internal node.

Figure 4:
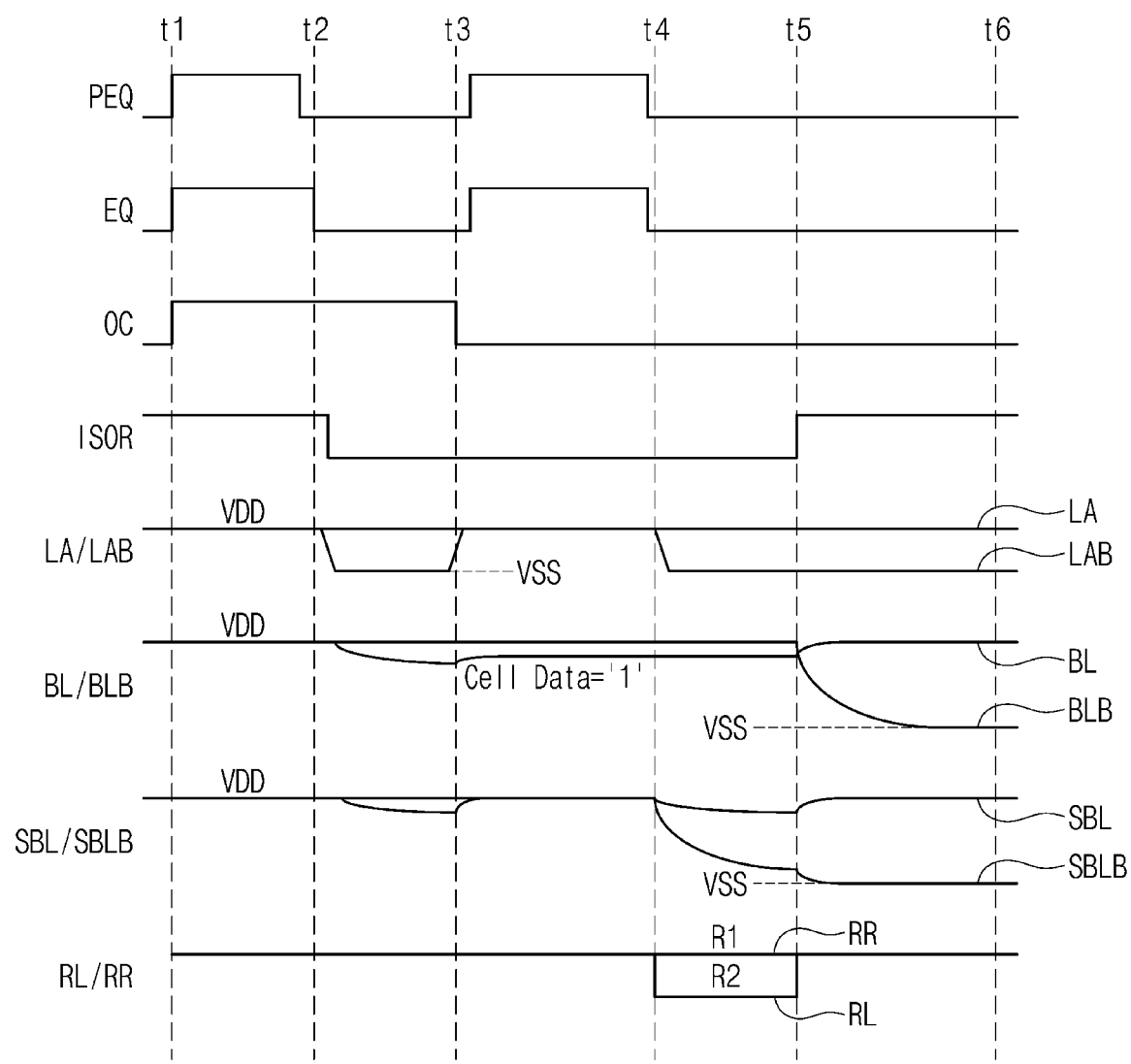
FIG. 4 is a timing diagram illustrating control signals for controlling a sense amplifier of FIG. 1, according to one or more embodiments of the present disclosure.

FIG. 4 is a timing diagram illustrating control signals for controlling a sense amplifier of FIG. 1.

Example control signals PEQ, EQ, OC, ISOR, LA, and LAB, voltage levels (e.g., voltage levels of BL, BLB, SBL, and SBLB), and resistance values (e.g., resistance values of RL and RR) over time are illustrated in FIG. 4.

Referring to FIGS. 2 and 4, the pre-charge operation may be performed during a time period from t1 to t2, and the offset compensation operation may be performed during a time period from t2 to t3. The charge sharing operation may be performed during a time period from t3 to t4, and the sensitivity control operation and the pre-sensing operation may be performed during a time period from t4 to t5. The restoring operation may be performed during a time period from t5 to t6. The operations performed in each of these time periods is explained in further detail in FIGS. 5A-5D.

Referring to FIGS. 3A and 4, the control signals PEQ, EQ, OC, ISOR, LA, and LAB may include the first and second equalization signals PEQ and EQ, the offset compensation signal OC, the isolation release signal ISOR, and the first and second power signals LA and LAB. The voltage levels may respectively indicate the voltage levels of the first bit line BL, the second bit line BLB, the first complementary bit line SBL, and the second complementary bit line SBLB. When the first sub sensitivity control circuit SSC1 and the second sub sensitivity control circuit SSC2 include the variable resistors RL and RR, the resistance values may indicate resistance values of the variable resistors RL and RR. The resistance values of the variable resistors RL and RR may be adjusted based on the first and second sensitivity control signals SCTL1 and SCTL2 illustrated in FIG. 3A.

FIGS. 5A, 5B, 5C, 5D, and 5E are circuit diagrams illustrating operations of a sense amplifier of FIG. 1.

Figure 5A:
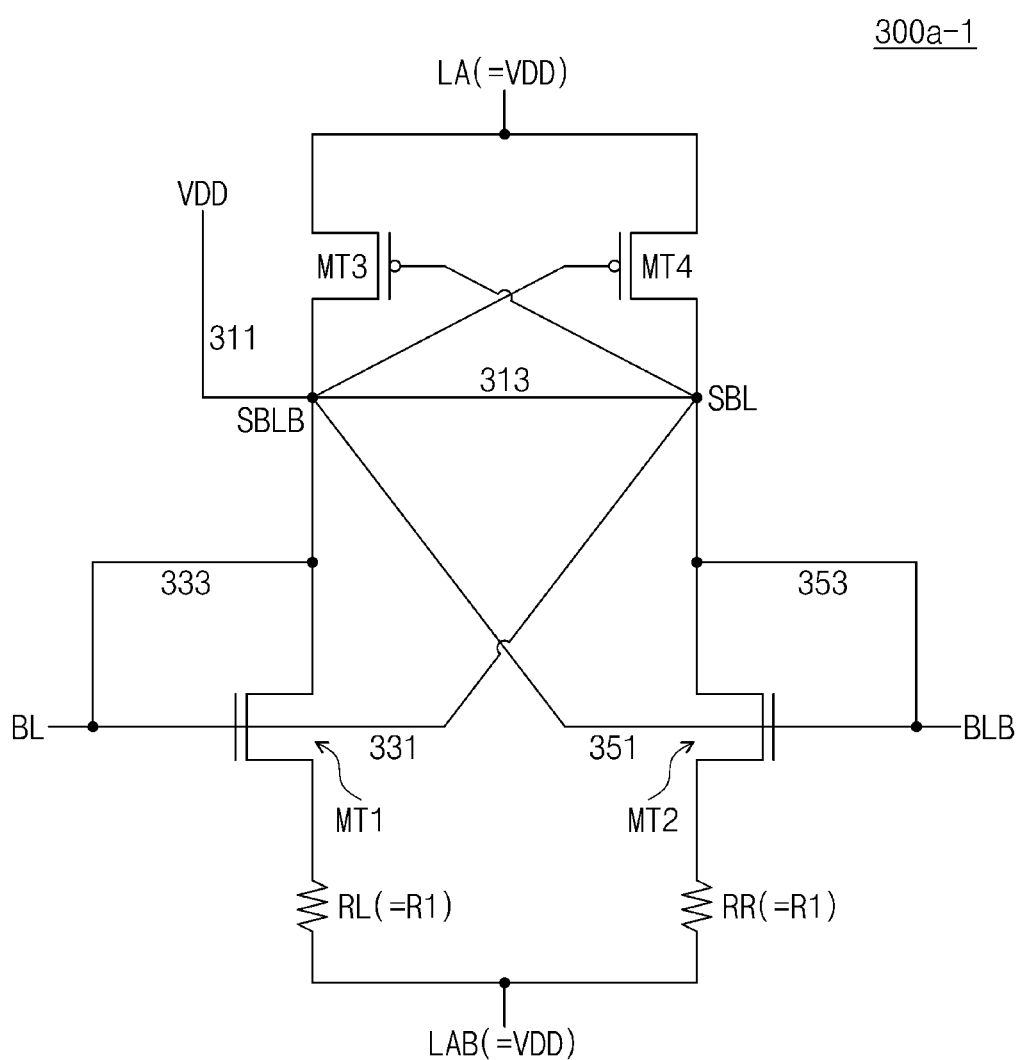
FIGS. 5A, 5B, 5C, 5D, and 5E are circuit diagrams illustrating operations of a sense amplifier of FIG. 1, according to one or more embodiments of the present disclosure.

Referring to FIGS. 3B, 4, and 5A, a sense amplifier 300a-1 corresponds to the case where the sense amplifier 300a performs the pre-charge operation during the time period from t1 to t2.

In the entire time period from t1 to t2, or a part thereof, each of the first and second equalization signals PEQ and EQ, the offset compensation signal OC, and the isolation release signal ISOR may maintain the high level (e.g., logic level high). In this case, the first and second equalization transistors 311 and 313, the first and second offset compensation transistors 333 and 353, and the first and second isolation transistors 331 and 351 may be turned on.

During the time period from t1 to t2, the voltage levels of the first and second power signals LA and LAB may be set to the first driving voltage (e.g., VDD). The first driving voltage may be one of the driving voltages of the volatile memory device.

In one or more embodiments, the voltage levels of the first and second sensing bit lines SBL and SBLB may be set to the first driving voltage. As the first and second isolation transistors 331 and 351 are turned on and the first and second offset compensation transistors 333 and 353 are turned on, the first sensing bit line SBL may be short-circuited with the first bit line BL, and the second sensing bit line SBLB may be short-circuited with the second bit line BLB. The first and second bit lines BL and BLB may be pre-charged with the first driving voltage.

In one or more embodiments, in the time period from t1 to t2, each of the variable resistors RL and RR may maintain a first resistance value (e.g., R1).

Figure 5B:
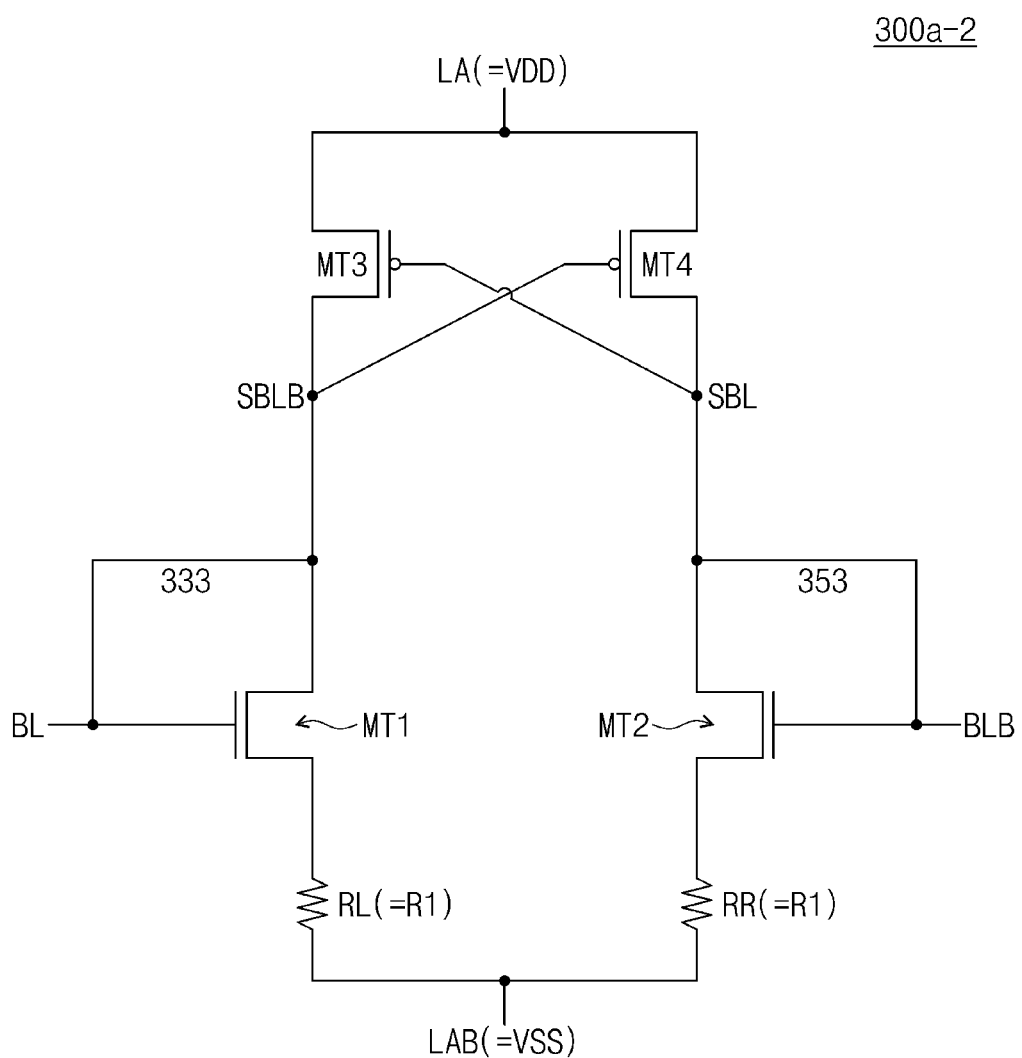

Referring to FIGS. 3B, 4, and 5B, a sense amplifier 300a-2 corresponds to the case where the sense amplifier 300a performs the offset compensation operation during the time period from t2 to t3.

In the entire time period from t2 to t3, or a part thereof, each of the first and second equalization signals PEQ and EQ and the isolation release signal ISOR may maintain the low level or may transition to the low level. The offset compensation signal OC may maintain the high level. In this case, the first and second equalization transistors 311 and 313 and the first and second isolation transistors 331 and 351 may be turned off, and the first and second offset compensation transistors 333 and 353 may be turned on.

In the entire time period from t2 to t3, or a part thereof, the voltage level of the first power signal LA may be set to the first driving voltage, and the voltage level of the second power signal LAB may be set to a second driving voltage (e.g., VSS). The second driving voltage VSS may be another of the driving voltages of the volatile memory device. The second driving voltage may be different from the first driving voltage.

In one or more embodiments, the voltage levels of the first and second sensing bit lines SBL and SBLB may be determined between the first driving voltage and the second driving voltage. For example, the voltage levels of the first and second sensing bit lines SBL and SBLB may be determined based on a mismatch component of the first and second MOS transistors MT1 and MT2.

In one or more embodiments, as the first and second offset compensation transistors 333 and 353 are turned on, the first sensing bit line SBL may be short-circuited with the second bit line BLB, and the second sensing bit line SBLB may be short-circuited with the first bit line BL. The offset between the first and second MOS transistors MT1 and MT2, which is caused by the mismatch component, may be stored as the voltage levels of the first and second bit lines BL and BLB (or may be applied to the voltage levels of the first and second bit lines BL and BLB) to compensate for the offset between the first and second MOS transistors MT1 and MT2.

In one or more embodiments, in the time period from t2 to t3, each of the variable resistors RL and RR may maintain the first resistance value (e.g., R1).

Figure 5C:
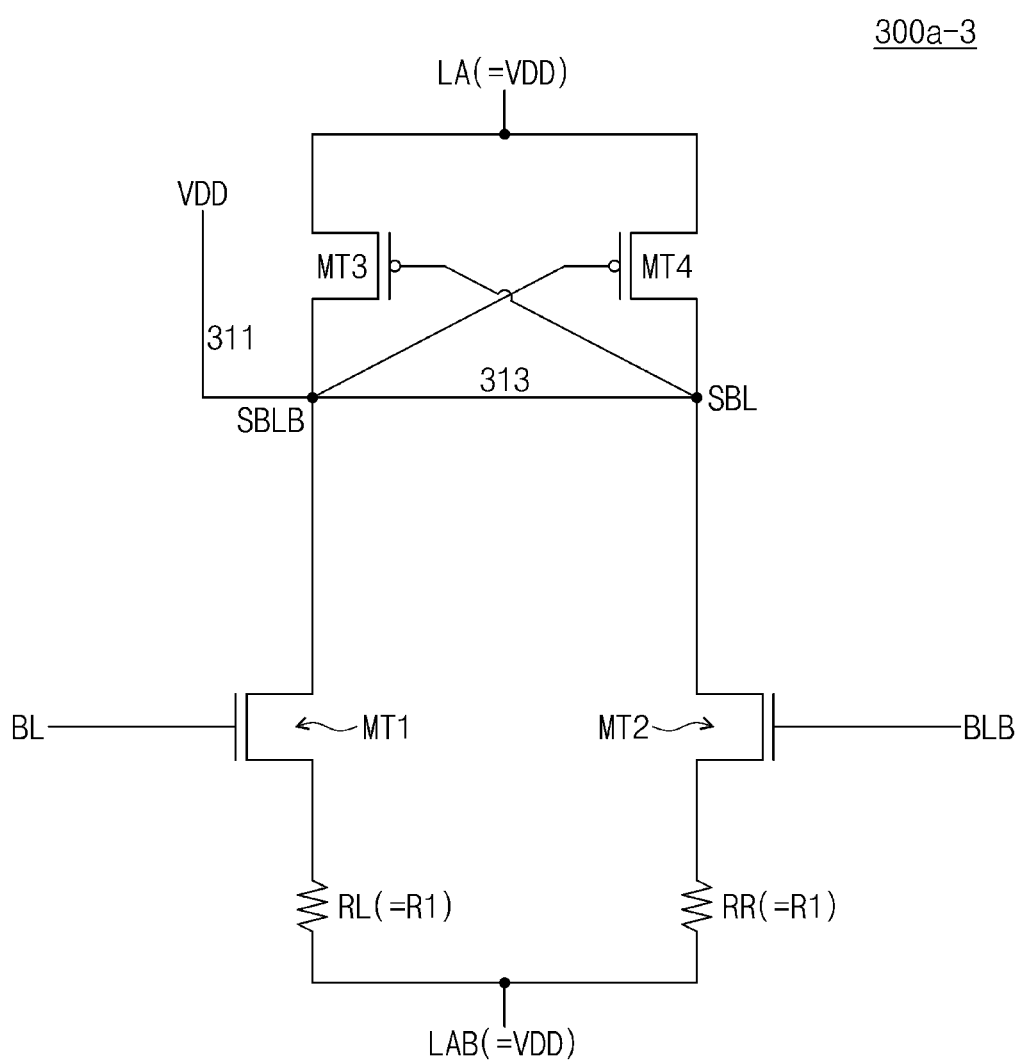

Referring to FIGS. 3B, 4, and 5C, a sense amplifier 300a-3 corresponds to the case where the sense amplifier 300a performs the charge sharing operation during the time period from t3 to t4.

In the entire time period from t3 to t4, or a part thereof, each of the first and second equalization signals PEQ and EQ may transition to the high level (e.g., logic high) or may maintain the high level. The offset compensation signal OC and the isolation release signal ISOR may maintain the low level or may transition to the low level (e.g., logic low). In this case, the first and second equalization transistors 311 and 313 may be turned on. The first and second offset compensation transistors 333 and 353 and the first and second isolation transistors 331 and 351 may be turned off.

In the entire time period from t3 to t4 or a part thereof, the voltage levels of the first and second power signals LA and LAB may be set to the first driving voltage.

In one or more embodiments, as the first and second equalization transistors 311 and 313 are turned on, the voltage levels of the first and second sensing bit lines SBL and SBLB may be set to the first driving voltage or may be maintained at the first driving voltage.

In one or more embodiments, the voltage level of the first bit line BL may be determined based on a result of the charge sharing between the target memory cell (e.g., the first memory cell MC1 of FIGS. 1 and 3A) and the first bit line BL connected with the target memory cell. In this case, a given voltage may be applied to a word line (e.g., WL1 of FIGS. 1 and 3A) connected with the target memory cell such that a cell capacitor of the target memory cell and the first bit line BL are connected. Because the second bit line BLB is complementary to the first bit line BL, the charge sharing may not be performed on data stored in a non-target memory cell. For example, in the case where data indicating a logical value of "1" are stored in the target memory cell (e.g., when cell data are "1"), as illustrated in FIG. 4, the voltage level of the first bit line BL may be increased slightly (e.g., as much as ΔV1) compared to the voltage level immediately after the offset compensation operation is performed. In the case where data indicating a logical value of "0" are stored in the target memory cell (i.e., when cell data are "0"), the voltage level of the first bit line BL may be decreased slightly (e.g., as much as AV2) compared to the voltage level immediately after the offset compensation operation is performed.

In one or more embodiments, in the time period from t3 to t4, the variable resistors RL and RR may maintain the first resistance value (e.g., R1).

Figure 5D:
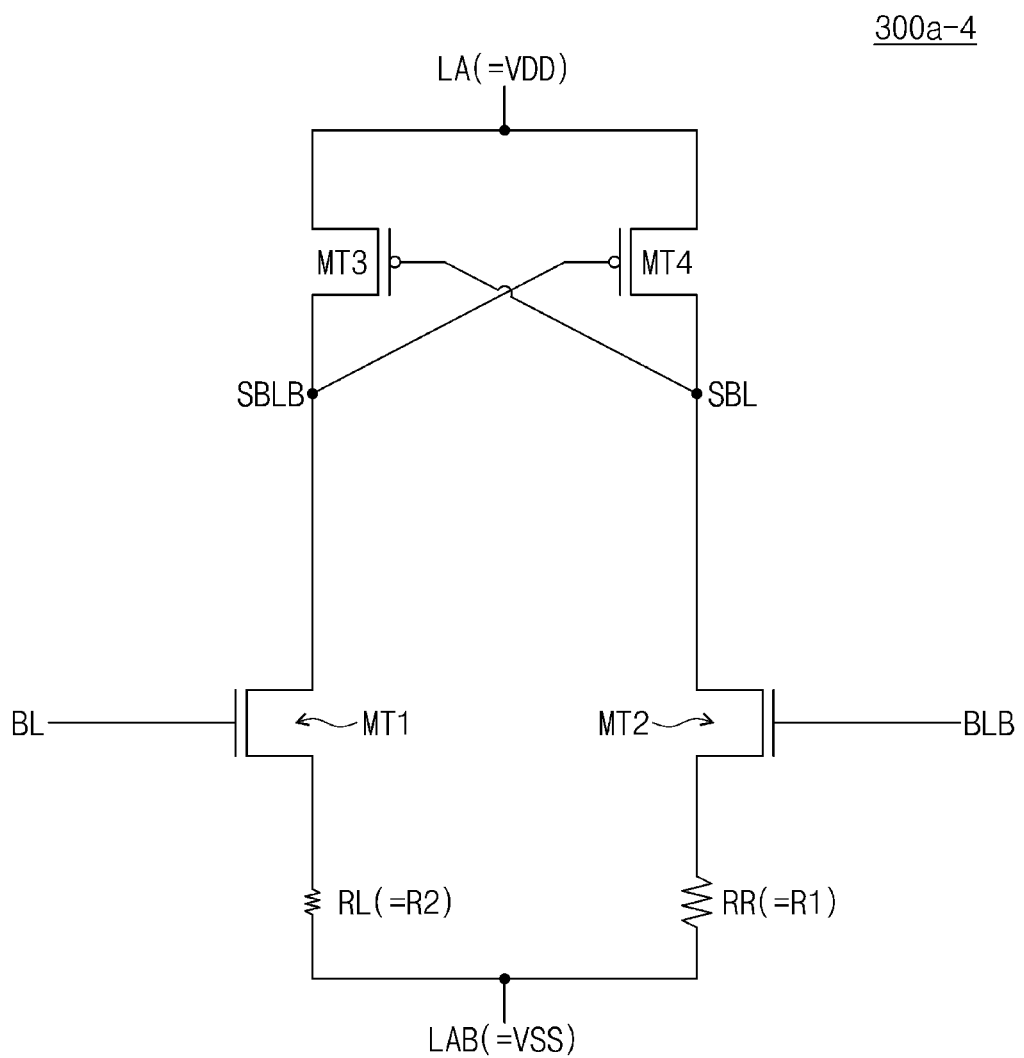

Referring to FIGS. 3B, 4, and 5D, a sense amplifier 300a-4 corresponds to the case where the sense amplifier 300a performs the sensitivity control operation and the pre-sensing operation during the time period from t4 to t5.

In the entire time period from t4 to t5, or a part thereof, the first and second equalization signals PEQ and EQ, the offset compensation signal OC, and the isolation release signal ISOR may maintain the low level. In this case, the first and second equalization transistors 311 and 313, the first and second isolation transistors 331 and 351, and the first and second offset compensation transistors 333 and 353 may be turned off.

In the time period from t4 to t5, the voltage level of the first power signal LA may be set to the first driving voltage, and the voltage level of the second power signal LAB may be set to the second driving voltage.

In one or more embodiments, because the voltage level of the first bit line BL is slightly increased by the charge sharing in the time period from t3 to t4, the first MOS transistor MT1 may be turned on more strongly than the second MOS transistor MT2. A magnitude of a current flowing through the first MOS transistor MT1 is greater than a magnitude of a current flowing through the second MOS transistor MT2, and a drain-source voltage of the first MOS transistor MT1 is smaller than a drain-source voltage of the second MOS transistor MT2, or as understood by one of ordinary skill in the art, a resistance component of the first MOS transistor MT1 may be smaller than a resistance component of the second MOS transistor MT2. As the voltage level of the first sensing bit line SBL slightly decreases and the voltage level of the second complementary bit line SBLB decreases more than that of the first sensing bit line SBL, the pre-sensing operation may be performed.

In one or more embodiments, in the time period from t4 to t5, the second variable resistor RR may maintain the first resistance value (e.g., R1), and the first variable resistor RL may be adjusted to have a second resistance value (e.g., R2) smaller than the first resistance value. In this case, the sensing sensitivity of the first MOS transistor MT1 for the target memory cell storing data indicating a logical value of "1" may increase. For example, as the magnitude of the first variable resistor RL decreases from the first resistance value to the second resistance value, the gate-source voltage of the first MOS transistor MT1 may increase compared to the case where the first variable resistor RL maintains the first resistance value, and thus, the magnitude of the current flowing through the first MOS transistor MT1 may increase.

Figure 5E:
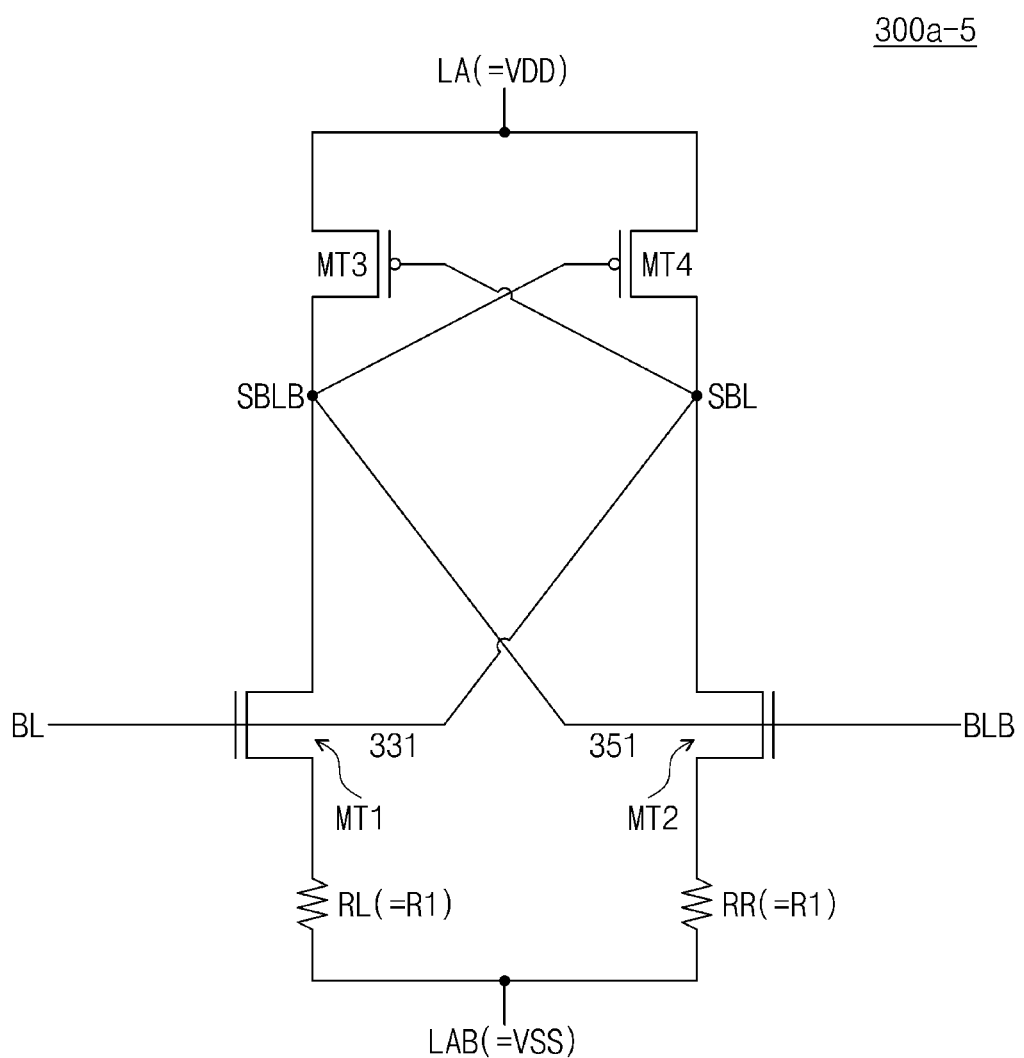

Referring to FIGS. 3B, 4, and 5E, a sense amplifier 300a-5 corresponds to the case where the sense amplifier 300a performs the restoring operation during the time period from t5 to t6.

In the time period from t5 to t6, the first and second equalization signals PEQ and EQ and the offset compensation signal OC may maintain the low level. The isolation release signal ISOR may transition to the high level. In this case, the first and second equalization transistors 311 and 313 and the first and second offset compensation transistors 333 and 353 may be turned off, and the first and second isolation transistors 331 and 351 may be turned on.

In the time period from t5 to t6, the voltage level of the first power signal LA may be maintained at the first driving voltage, and the voltage level of the second power signal LAB may be maintained at the second driving voltage.

In one or more embodiments, as the first and second isolation transistors 331 and 351 are turned on, the first sensing bit line SBL may be short-circuited with the first bit line BL, and the second sensing bit line SBLB may be short-circuited with the second bit line BLB. The first MOS transistor MT1 and the third MOS transistor MT3 may constitute a first inverter, the second MOS transistor MT2 and the fourth MOS transistor MT4 may constitute a second inverter, and a latch structure may be formed by the first inverter and the second inverter. As the voltage levels of the first bit line BL and the first sensing bit line SBL increase to the first driving voltage and the voltage levels of the second bit line BLB and the second complementary bit line SBLB decrease to the second driving voltage, the restoring operation may be performed.

In one or more embodiments, in the time period from t5 to t6, the second variable resistor RR may maintain the first resistance value (e.g., R1), and the first variable resistor RL may be adjusted from the second resistance value (e.g., R2) to the first resistance value.

Figure 6:
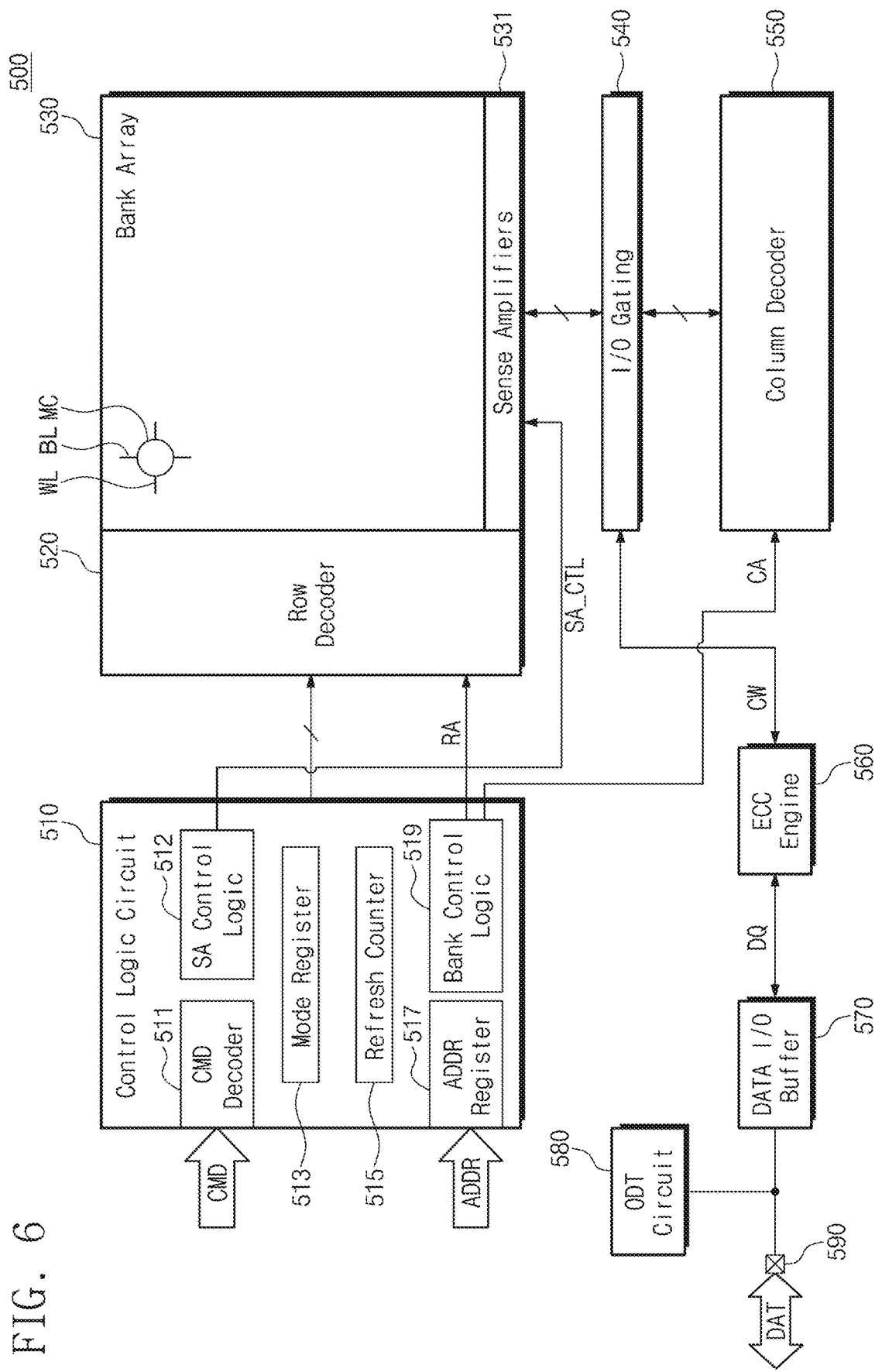
FIG. 6 is a block diagram illustrating a volatile memory device according to one or more embodiments of the present disclosure.

FIG. 6 is a block diagram illustrating a volatile memory device according to one or more embodiments of the present disclosure.

The address register 517 may receive the address ADDR including a bank address, a row address, and a column address from the memory controller. The address register 517 may provide the bank address to the bank control logic 519, and the bank control logic 19 provides the row address (RA) to the row decoder 520, and may provide the column address (CA) to the column decoder 550.

The bank array 530 may include a plurality of bank arrays. The plurality of bank arrays may be arranged as a grid with a corresponding plurality of rows and a plurality of columns. The row decoder 520 may include a plurality of bank row decoders connected with corresponding rows of the plurality of bank arrays, the column decoder 550 may include a plurality of bank column decoders connected with corresponding columns of the plurality of bank arrays. The sense amplifiers 531 may include a plurality of bank sense amplifiers with each sense amplifier connected with a corresponding bank array from the plurality of bank arrays. The plurality of bank arrays, the plurality of bank row decoders, the plurality of bank column decoders, and the plurality of bank sense amplifiers may be referred to as a plurality of banks. Each of the plurality of bank arrays may include a plurality of memory cells MC that are formed at intersections of a plurality of word lines WL and a plurality of bit lines BL.

Referring to FIG. 6, a memory device 500 may include a control logic circuit 510, a row decoder 520, a bank array 530, sense amplifiers 531, an input/output gating circuit 540, a column decoder 550, an Error Correction Code (ECC) engine 560, a data input/output buffer 570, and an on-die termination (ODT) circuit 580. The control logic circuit 510 may include a command decoder 511, sense amplifier control logic 512, a mode register 513, a refresh counter 515, an address register 517, and bank control logic 519. For example, the memory device 500 may be a volatile memory device. In detail, the memory device 500 may be a DRAM.

The bank control logic 519 may generate a bank control signal in response to the bank address. A bank row decoder and a bank column decoder that correspond to the bank address may be activated based on the bank control signal.

The refresh counter 515 may generate a refresh row address that sequentially increases or decreases under control of the control logic circuit 510. Bank column decoders activated from among the plurality of bank column decoders may activate the sense amplifiers 531, which correspond to the bank address, the row address, and the column address, by using the input/output gating circuit 540.

A codeword CW read from one bank array from the plurality of bank arrays may be sensed by sense amplifiers corresponding to the one bank array. The ECC engine 560 may perform ECC decoding on the sensed codeword CW, and a data signal DQ-signal may be provided to the memory controller through the data input/output buffer 570 as an ECC decoding result. Data DAT transmitted from an input/output pad 590 to the data input/output buffer 570 may be the multi-level data described with reference to FIGS. 1 and 4. The data input/output buffer 570 may include reception drivers for encoding the multi-level data and may receive the reference voltages VREF1, VREF2, and VREF3 for the encoding.

The data DAT to be written in one of the plurality of bank arrays may be provided to the ECC engine 560. In response, the ECC engine 560 may generate parity bits based on the data DAT and may provide a codeword including the data DAT and the parity bits to the input/output gating circuit 540, and the input/output gating circuit 540 may write the codeword in the one bank array.

The ODT circuit 580 may be connected with the data input/output pad 590 and the data input/output buffer 570. The ODT circuit 580 may perform impedance matching.

The control logic circuit 510 may control the operation of the memory device 500. For example, the control logic circuit 510 may generate control signals such that the memory device 500 performs a write operation or a read operation. The control logic circuit 510 may include the command decoder 511 that decodes the command CMD received from the memory controller and the mode register 513 for setting an operation mode of the memory device 500. For example, the command decoder 511 may decode a write enable signal, a row address strobe signal, a column address strobe signal, a chip select signal, etc. and may generate the control signals corresponding to the command CMD. The control logic circuit 510 may include the sense amplifier control logic 512 that generates the sense amplifier control signal SA_CTL of FIG. 1 including the control signals PEQ, EQ, OC, ISOR, LA, LAB, SCTL1, and SCTL2. For example, the sense amplifier control logic 512 may generate the first and second equalization signals PEQ and EQ, the offset compensation signal OC, the isolation release signal ISOR, the first and second power signals LA and LAB, and the first and second sensitivity control signals SCTL1 and SCTL2.

Figure 7A:
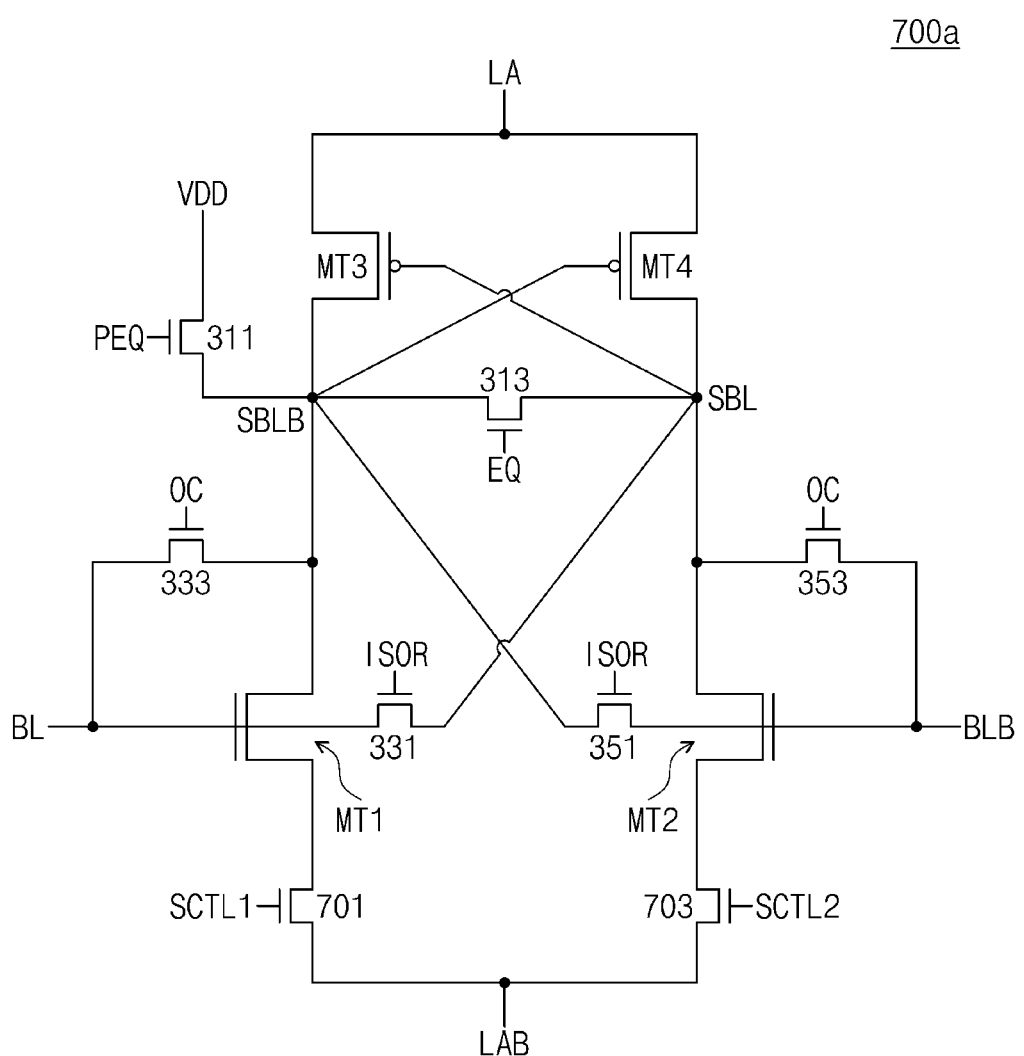
FIGS. 7A and 7B are circuit diagrams illustrating embodiments of a sense amplifier of FIG. 1.
Figure 7B:
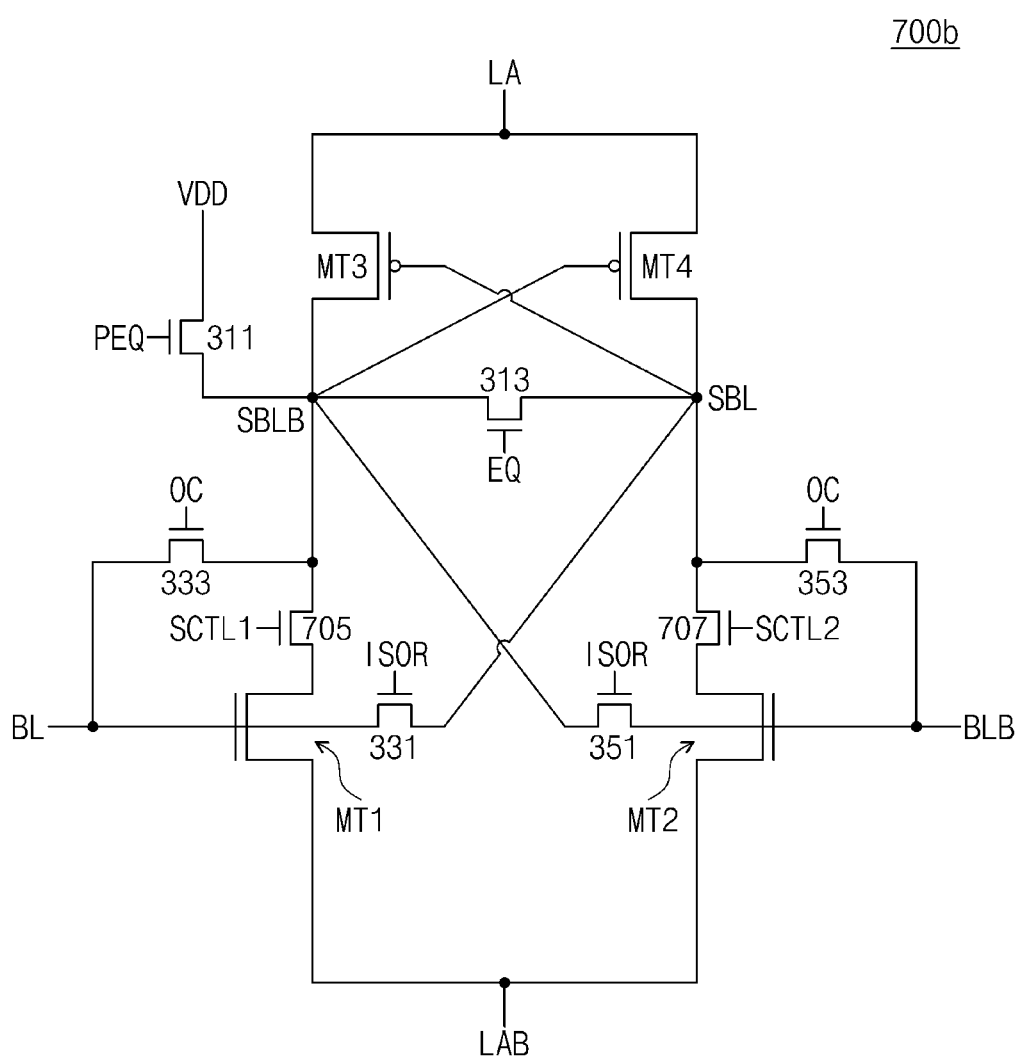

FIGS. 7A and 7B are circuit diagrams illustrating embodiments of a sense amplifier of FIG. 1.

Referring to FIGS. 3A, 3B, 7A, and 7B, each of sense amplifiers 700a (FIG. 7A) and 700b (FIG. 7B) may correspond to each of the sense amplifiers 300 and 300a illustrated in FIGS. 3A and 3B, respectively. FIGS. 3A, 3B, 7A, and 7B, components that are marked by the same reference numerals/signs may perform substantially the same function.

Referring to FIG. 7A, the sense amplifier 700a may include a sensitivity control circuit (e.g., 130 of FIG. 1).

In one or more embodiments, the sensitivity control circuit may include a first sensitivity control transistor 701 and a second sensitivity control transistor 703. The first sensitivity control transistor 701 may be connected between the source terminal of the first MOS transistor MT1 and the second power node to which the second power signal LAB is applied, and the second sensitivity control transistor 703 may be connected between the source terminal of the second MOS transistor MT2 and the second power node.

Referring to FIG. 7B, the sense amplifier 700b may include a sensitivity control circuit (e.g., 130 of FIG. 1).

In one or more embodiments, the sensitivity control circuit may include a third sensitivity control transistor 705 and a fourth sensitivity control transistor 707. The third sensitivity control transistor 705 may be connected between the drain terminal of the first MOS transistor MT1 and the second sensing bit line SBLB, and the fourth sensitivity control transistor 707 may be connected between the drain terminal of the second MOS transistor MT2 and the first sensing bit line SBL.

In one or more embodiments, the sensitivity control circuit may control gate voltages applied to the first and second sensitivity control transistors 701 and 703 or the third and fourth sensitivity control transistors 705 and 707 based on the first and second sensitivity control signals SCTL1 and SCTL2. For example, after the charge sharing described with reference to FIGS. 4 and 5C, the sensitivity control circuit may increase the gate voltage applied to the first sensitivity control transistor 701 and may maintain the gate voltage applied to the second sensitivity control transistor 703. For example, after the charge sharing, the sensitivity control circuit may increase the gate voltage applied to the third sensitivity control transistor 705 and may maintain the gate voltage applied to the fourth sensitivity control transistor 707. In this case, an increase in the sensing sensitivity of the first MOS transistor MT1 may be implemented as in the above description, where the sensing sensitivity of the first MOS transistor MT1 is increased depending on the sensitivity control operation described with reference to FIGS. 4 and 5.

Figures 8, 9:
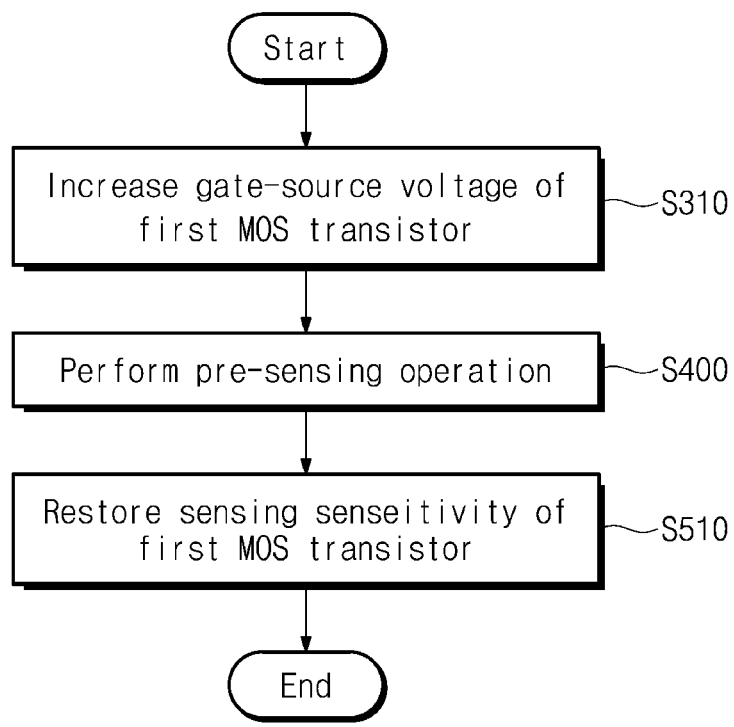
FIG. 8 is a flowchart for describing operations of sense amplifiers of FIGS. 7A and 7B, according to one or more embodiments of the present disclosure.
FIG. 9 is a diagram for describing control signals provided to sense amplifiers of FIGS. 7A and 7B, according to one or more embodiments of the present disclosure.

FIG. 8 is a flowchart for describing operations of sense amplifiers of FIGS. 7A and 7B, according to one or more embodiments.

Referring to FIGS. 2, 7A, 7B, and 8, each of the sense amplifiers 700a and 700b may increase the gate-source voltage of the first MOS transistor MT1 (S310), may perform the pre-sensing operation (S400), and may restore the sensing sensitivity of the first MOS transistor MT1 (S510).

In one or more embodiments, operation S310 may be included in operation S300 of FIG. 2, and operation S510 may be included in operation S500 of FIG. 2.

In one or more embodiments, the increase in the gate-source voltage of the first MOS transistor MT1 in operation S310 and the restoration of the sensing sensitivity of the first MOS transistor MT1 in operation S510 may be performed based on the first and second sensitivity control signals SCTL1 and SCTL2.

In one or more embodiments, operation S510 may be performed immediately after the pre-sensing operation described with reference to FIGS. 4 and 5D is completed.

FIG. 9 is a diagram for describing control signals provided to sense amplifiers of FIGS. 7A and 7B.

Referring to FIGS. 7A, 7B, and 9, the first sensitivity control signal SCTL1 and the second sensitivity control signal SCTL2 may be provided to the sense amplifier 700a/700b during the pre-sensing operation described with reference to FIGS. 4 and 5D.

In one or more embodiments, as described with reference to FIGS. 1 and 3A, when a memory cell connected with the first bit line BL corresponds to the target memory cell (e.g., BL side), the first sensitivity control signal SCTL1 may have a first voltage value (e.g., 1.4 V), and the second sensitivity control signal SCTL2 may have a second voltage value (e.g., 0.9 V). Because the voltage value of the first sensitivity control signal SCTL1 is greater than the voltage value of the second sensitivity control signal SCTL2, the first sensitivity control transistor 701 may be turned on more strongly than the second sensitivity control transistor 703, or the third sensitivity control transistor 705 may be turned on more strongly than the fourth sensitivity control transistor 707. The resistance component of the first sensitivity control transistor 701 or the third sensitivity control transistor 705 may be smaller than the resistance component of the second sensitivity control transistor 703 or the fourth sensitivity control transistor 707, which results in a high sensing sensitivity of the first MOS transistor MT1. In one or more embodiments, when a memory cell connected with the second bit line BLB corresponds to the target memory cell (e.g., BLB side), the first sensitivity control signal SCTL1 may have the second voltage value, and the second sensitivity control signal SCTL2 may have the first voltage value.

Figure 10A:
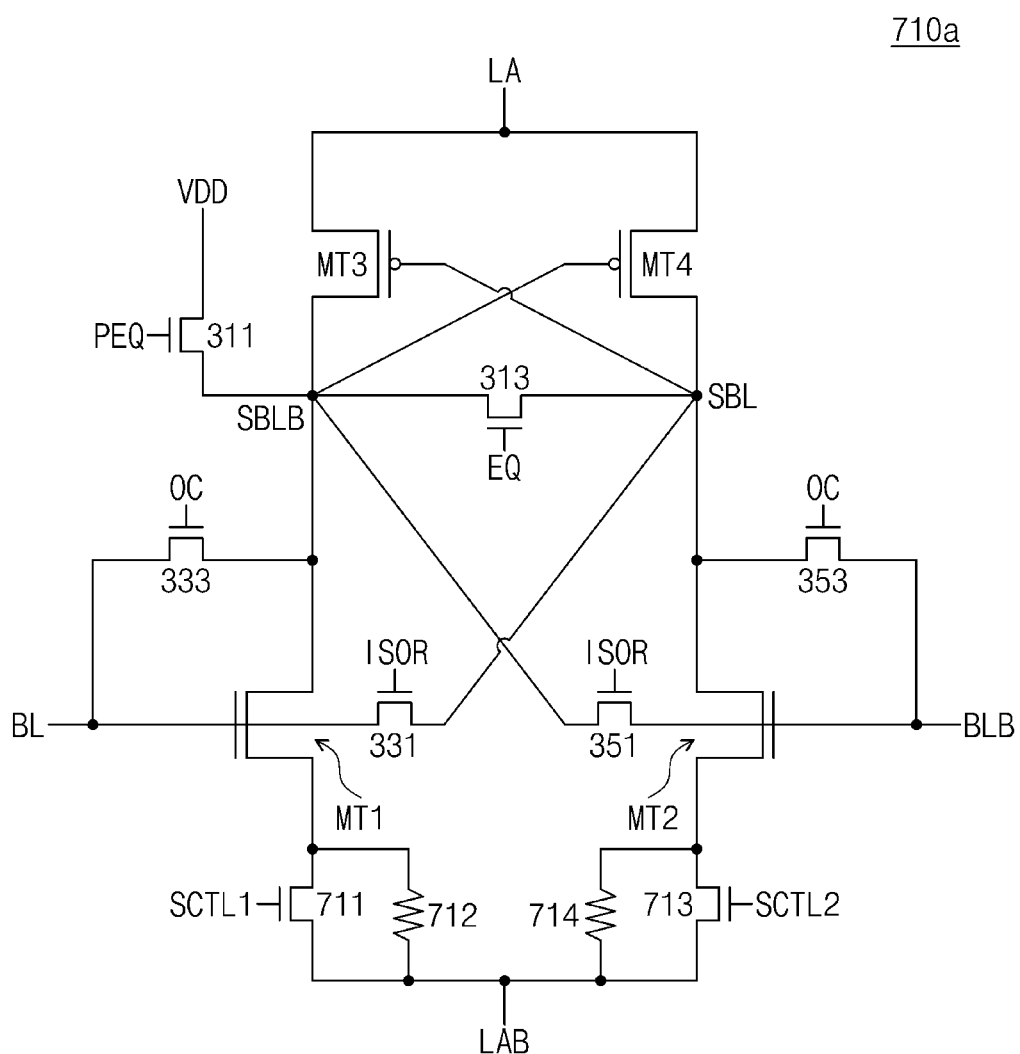
FIGS. 10A and 10B are circuit diagrams illustrating embodiments of a sense amplifier of FIG. 1, according to one or more embodiments of the present disclosure.
Figure 10B:
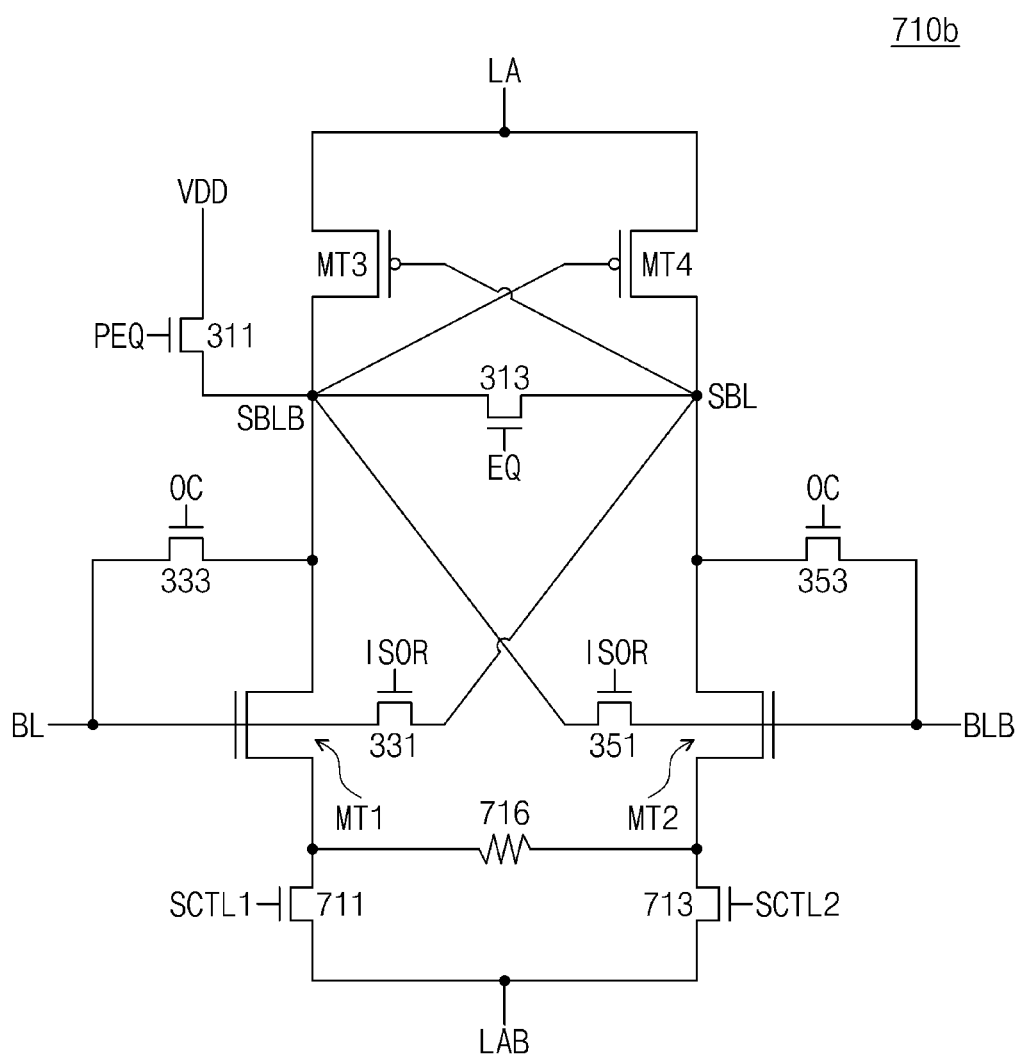

FIGS. 10A and 10B are circuit diagrams illustrating embodiments of a sense amplifier of FIG. 1.

Referring to FIGS. 3A, 3B, 10A, and 10B, each of sense amplifiers 710a (FIG. 7A) and 710b (FIG. 7B) may correspond to each of the sense amplifiers 300 and 300a illustrated in FIGS. 3A and 3B. In FIGS. 3A, 3B, 10A, and 10B, components that are marked by the same reference numerals/signs may perform substantially the same function.

Referring to FIG. 10A, the sense amplifier 710a may include a sensitivity control circuit (e.g., 130 of FIG. 1).

In one or more embodiments, the sensitivity control circuit may include a fifth sensitivity control transistor 711, a sixth sensitivity control transistor 713, a first resistor 712, and a second resistor 714. Compared to the sense amplifier 700a of FIG. 7A, the sense amplifier 710a may correspond to one or more embodiments in which the first resistor 712 and the second resistor 714 are further included. The fifth sensitivity control transistor 711 and the first resistor 712 may be connected between the source terminal of the first MOS transistor MT1 and the second power node to which the second power signal LAB is applied. The sixth sensitivity control transistor 713 and the second resistor 714 may be connected between the source terminal of the second MOS transistor MT2 and the second power node.

Referring to FIG. 10B, the sense amplifier 710b may include a sensitivity control circuit (e.g., 130 of FIG. 1).

In one or more embodiments, the sensitivity control circuit may include the fifth sensitivity control transistor 711, the sixth sensitivity control transistor 713, and a third resistor 716. Compared to the sense amplifier 700a of FIG. 7A, the sense amplifier 710b may correspond to one or more embodiments in which the third resistor 716 is further included. The third resistor 716 may be connected between the source terminal of the first MOS transistor MT1 and the source terminal of the second MOS transistor MT2.

In one or more embodiments, the sensitivity control circuit may control the gate voltages applied to the fifth and sixth sensitivity control transistors 711 and 713 based on the first and second sensitivity control signals SCTL1 and SCTL2. For example, after the charge sharing described with reference to FIGS. 4 and 5, the sensitivity control circuit may increase the gate voltage applied to the fifth sensitivity control transistor 711 and may apply the gate voltage for turning off the sixth sensitivity control transistor 713 to the sixth sensitivity control transistor 713. In this case, an increase in the sensing sensitivity of the first MOS transistor MT1 may be implemented as in the above description in which the sensing sensitivity of the first MOS transistor MT1 is increased depending on the sensitivity control operation described with reference to FIGS. 4 and 5D.

FIG. 11 is a diagram for describing control signals provided to sense amplifiers of FIGS. 10A and 10B, according to one or more embodiments.

Referring to FIGS. 10A, 10B, and 11, the first sensitivity control signal SCTL1 and the second sensitivity control signal SCTL2 may be provided to the sense amplifier 710a/710b during the pre-sensing operation described with reference to FIGS. 4 and 5.

In one or more embodiments, as described with reference to FIGS. 1 and 3A, when a memory cell connected with the first bit line BL corresponds to the target memory cell (e.g., BL side), the first sensitivity control signal SCTL1 may have a first voltage value (e.g., 1.4 V), and the second sensitivity control signal SCTL2 may have a third voltage value (e.g., 0 V). The fifth sensitivity control transistor 711 may be turned on by the voltage value of the first sensitivity control signal SCTL1, and the sixth sensitivity control transistor 713 may be turned off by the voltage value of the second sensitivity control signal SCTL2. A magnitude of a resistance component formed between the source terminal of the first MOS transistor MT1 and the second power node is greater than a magnitude of a resistance component formed between the source terminal of the second MOS transistor MT2 and the second power node, which results in a high sensing sensitivity of the first MOS transistor MT1. In one or more embodiments, when a memory cell connected with the second bit line BLB corresponds to the target memory cell (e.g., BLB side), the first sensitivity control signal SCTL1 may have the third voltage value, and the second sensitivity control signal SCTL2 may have the first voltage value.

Figure 12A:
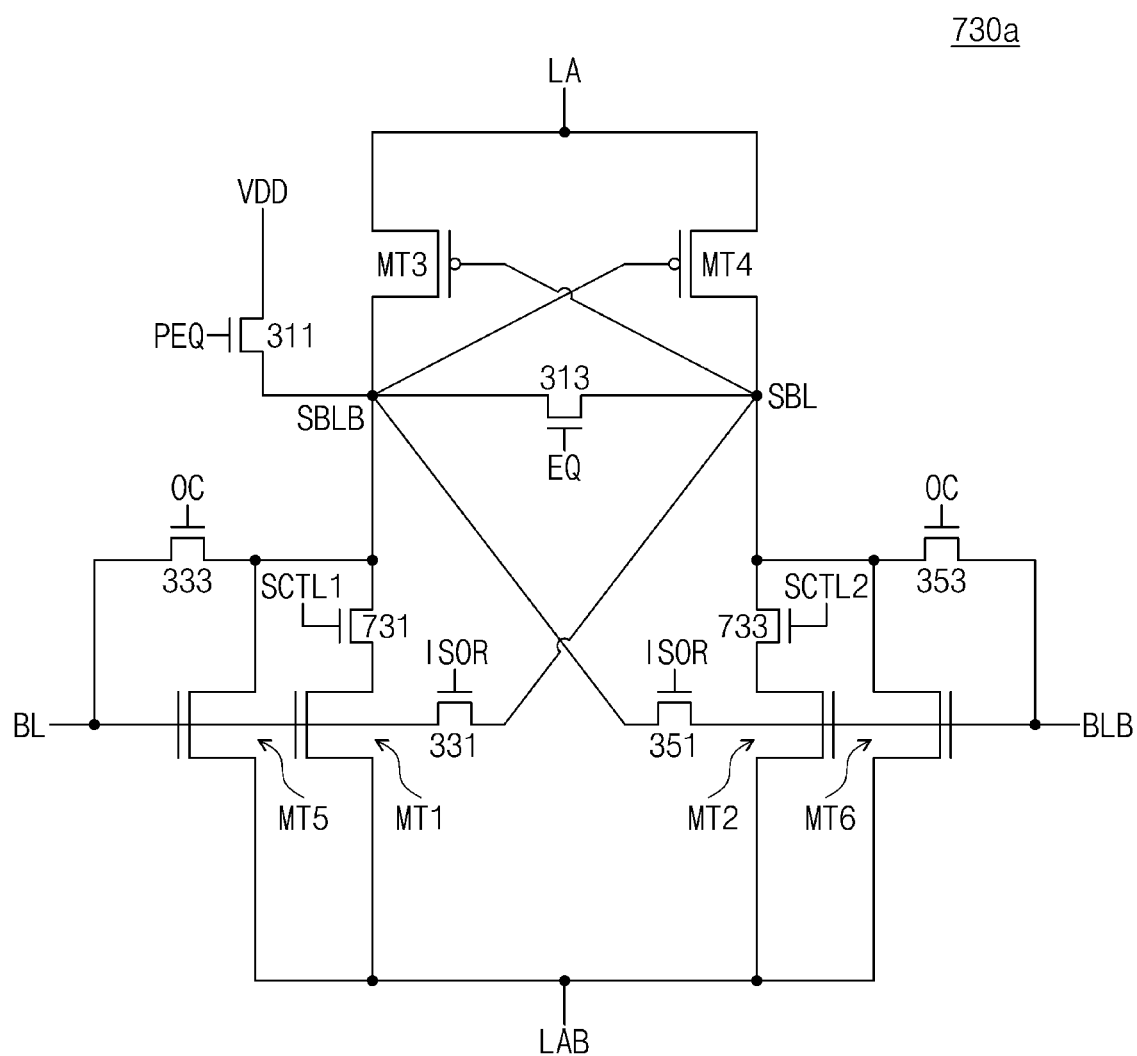
FIGS. 12A and 12B are circuit diagrams illustrating embodiments of a sense amplifier of FIG. 1, according to one or more embodiments of the present disclosure.
Figure 12B:
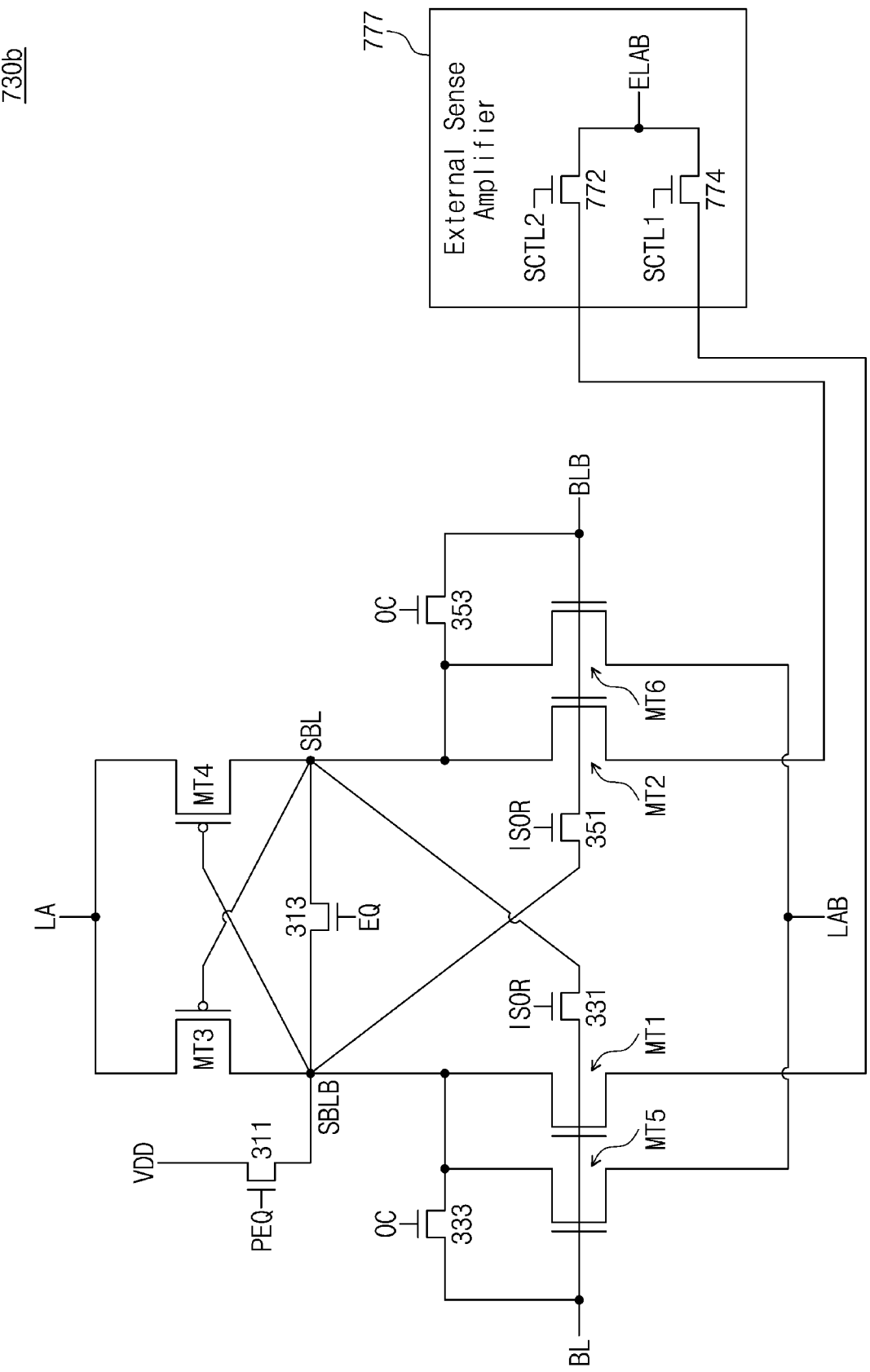

FIGS. 12A and 12B are circuit diagrams illustrating embodiments of a sense amplifier of FIG. 1.

Referring to FIGS. 3A, 3B, 12A, and 12B, each of sense amplifiers 730a (FIG. 12A) and 730b (FIG. 12B) may correspond to each of the sense amplifiers 300a and 300b illustrated in FIGS. 3A and 3B, respectively. In FIGS. 3A, 3B, 12A, and 12B, components that are marked by the same reference numerals/signs may perform substantially the same function.

Referring to FIG. 12A, the sense amplifier 730a may include a seventh sensitivity control transistor 731, an eighth sensitivity control transistor 733, a first channel expansion transistor MT5, and a second channel expansion transistor MT6. Compared to the sense amplifier 700b of FIG. 7B, the sense amplifier 730a may correspond to one or more embodiments in which the first and second channel expansion transistors MT5 and MT6 are further included. The seventh sensitivity control transistor 731 may be connected between the drain terminal of the first MOS transistor MT1 and the second sensing bit line SBLB. The eighth sensitivity control transistor 733 may be connected between the drain terminal of the second MOS transistor MT2 and the first sensing bit line SBL. The first channel expansion transistor MT5 may be connected between the drain terminal and the source terminal of the first MOS transistor MT1. The second channel expansion transistor MT6 may be connected between the drain terminal and the source terminal of the second MOS transistor MT2.

Referring to FIG. 12B, the sense amplifier 730b may include a ninth sensitivity control transistor 772, a tenth sensitivity control transistor 774, the first channel expansion transistor MT5, and the second channel expansion transistor MT6. The ninth and tenth sensitivity control transistors 772 and 774 may be disposed in an external sense amplifier 777 distinguished from the sense amplifier 730b. For example, the external sense amplifier 777 may be a local sense amplifier that is connected through column selection lines and local data lines of the volatile memory device, and amplifies a received data signal so as to be output to global data lines. The external sense amplifier 777 may include a third power node to which an external power signal ELAB is applied. The ninth sensitivity control transistor 772 may be connected between the source terminal of the second MOS transistor MT2 and the third power node. The tenth sensitivity control transistor 774 may be connected between the source terminal of the first MOS transistor MT1 and the third power node.

In one or more embodiments, the sensitivity control circuit may control gate voltages applied to the seventh, eighth, ninth, and tenth sensitivity control transistors 731, 733, 772 and 774, respectively, based on the first and second sensitivity control signals SCTL1 and SCTL2. For example, after the charge sharing described with reference to FIGS. 4 and 5C, the sensitivity control circuit may increase the gate voltage applied to the seventh sensitivity control transistor 731 or the tenth sensitivity control transistor 774, and may apply the gate voltage for turning off the seventh sensitivity control transistor 731 or the ninth sensitivity control transistor 772 to the seventh sensitivity control transistor 731 or the ninth sensitivity control transistor 772. In this case, an increase in the sensing sensitivity of the first MOS transistor MT1 may be implemented as in the above description in which the sensing sensitivity of the first MOS transistor MT1 is increased depending on the sensitivity control operation described with reference to FIGS. 4 and 5.

FIG. 13 is a flowchart for describing operations of sense amplifiers of FIGS. 12A and 12B.

Referring to FIGS. 2, 12A, 12B, and 13, the sense amplifier 730a or 730b may increase the effective channel width of the first MOS transistor MT1 (S330).

In one or more embodiments, operation S330 may be included in operation S300 of FIG. 2.

In one or more embodiments, the increase in the effective channel width of the first MOS transistor MT1 in operation S330 may be performed based on the first and second sensitivity control signals SCTL1 and SCTL2.

In one or more embodiments, operation S330 may be performed immediately after the offset compensation operation described with reference to FIGS. 4 and 5B is completed.

FIG. 14 is a diagram for describing control signals provided to sense amplifiers of FIGS. 12A and 12B.

Referring to FIGS. 12A, 12B, and 14, the first sensitivity control signal SCTL1 and the second sensitivity control signal SCTL2 may be provided to the sense amplifiers 730a or 730b during the pre-sensing operation described with reference to FIGS. 4 and 5D.

In one or more embodiments, as described with reference to FIGS. 1 and 3A, when a memory cell connected with the first bit line BL corresponds to the target memory cell (e.g., BL side), the first sensitivity control signal SCTL1 may have a first voltage value (e.g., 1.4 V), and the second sensitivity control signal SCTL2 may have a third voltage value (e.g., 0 V). The seventh sensitivity control transistor 731 or the tenth sensitivity control transistor 774 may be turned on by the voltage value of the first sensitivity control signal SCTL1, and the eighth sensitivity control transistor 733 or the ninth sensitivity control transistor 772 may be turned off by the voltage value of the second sensitivity control signal SCTL2. An effective channel width of a composite MOS transistor formed between the second sensing bit line SBLB and the second power node to which the second power signal LAB is applied may be greater than an effective channel width of a composite MOS transistor formed between the first sensing bit line SBL and the second power node, which results in a high sensing sensitivity of the first MOS transistor MT1. In one or more embodiments, when a memory cell connected with the second bit line BLB corresponds to the target memory cell (e.g., BLB side), the first sensitivity control signal SCTL1 may have the third voltage value, and the second sensitivity control signal SCTL2 may have the first voltage value.

Figure 15:
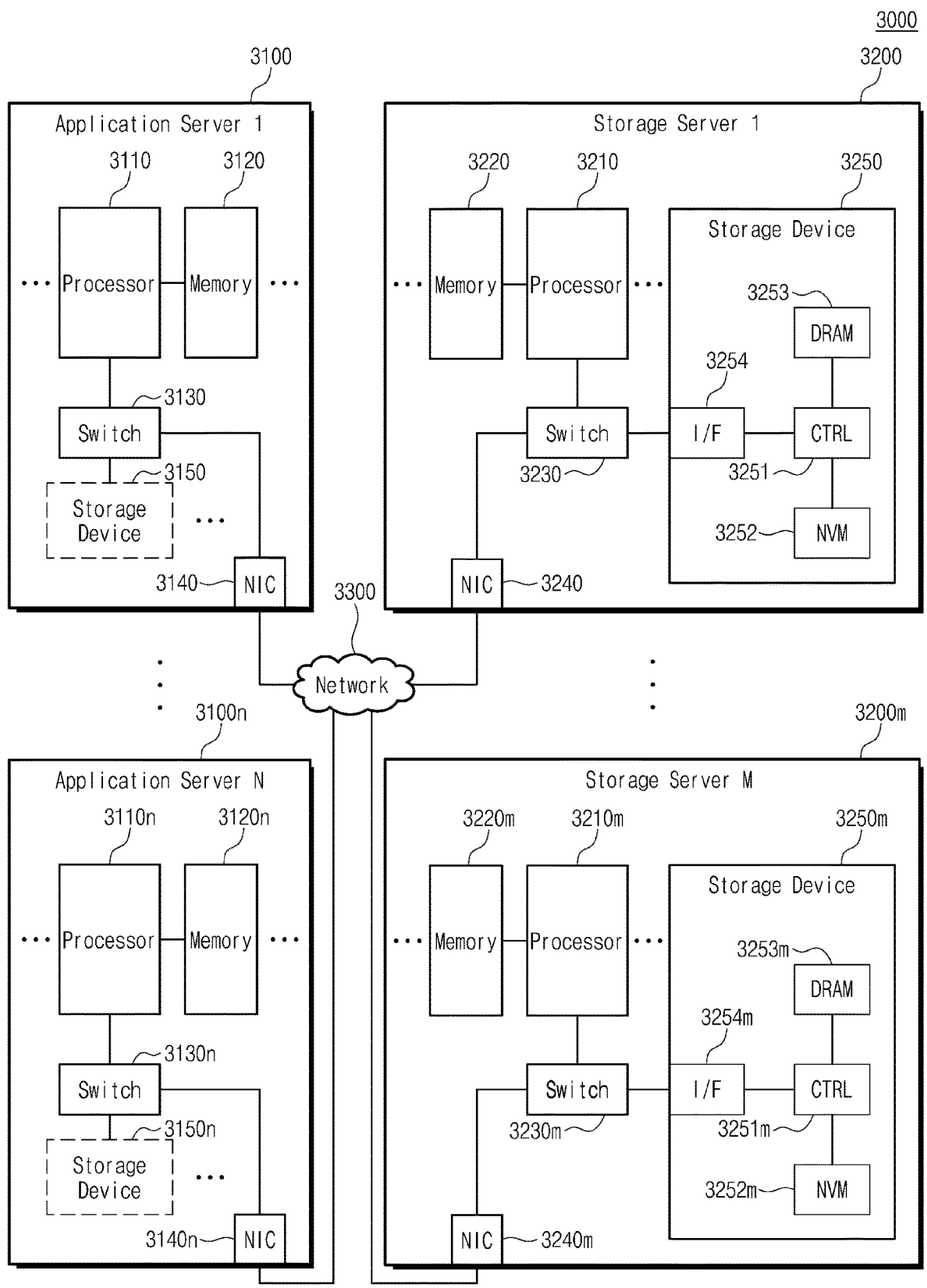
FIG. 15 is a diagram illustrating a data center to which a volatile memory device, according to one or more embodiments of the present disclosure, is applied.

FIG. 15 is a diagram of a data center 3000 to which a memory device is applied, according to one or more embodiments.

Referring to FIG. 15, the data center 3000 may be a facility that collects various types of pieces of data and provides services. The data center 3000 may be referred to as a data storage center. The data center 3000 may provide cloud services for remote storage of data. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 may include at least one processor 3110 and at least one memory 3120. The storage server 3200 may include at least one processor 3210 and at least one memory 3220. The storage server 3200 is next described in further detail according to one or more examples. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In one or more embodiments, the processor 3210 and the memory 3220 may provide a processor-memory pair. In one or more embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In one or more embodiments, the network 3300 may be a storage-dedicated network, such as a storage area network (SAN). For example, the SAN may be an FC-SAN, which uses an FC network and is implemented according to an FC protocol (FCP). In one or more examples, the SAN may be an Internet protocol (IP)-SAN, which uses a transmission control protocol (TCP)/IP network and is implemented according to a SCSI over TCP/IP or Internet SCSI (iSCSI) protocol. In one or more embodiments, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

The application server 3100 and the storage server 3200 are described next according to one or more examples. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Furthermore, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. In one or more examples, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 is next described according to one or more examples. An interface 3254 may provide physical connection between a processor 3210 and a controller 3251. The interface 3254 may provide a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250, or selectively connect the NIC 3240 to the storage device 3250 via the control of the processor 3210.

In one or more embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In one or more embodiments, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy. Each of the application servers 3100-3100n may include respective switches 3130-3130n and respective NICs 3140-3140n.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In one or more embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Furthermore, the DRAM 3253 may store metadata. Here, the metadata may be user data or data generated by the controller 3251 to manage the NAND flash memory device 3252. The storage device 3250 may include a secure element (SE) for security or privacy.

Some or all of the memories 3120 to 3120n and 3220 to 3220m and the DRAM 3253 may include the sense amplifier according to embodiments of the present disclosure. Accordingly, each of the memories 3120 to 3120n and 3220 to 3220m and the DRAM 3253 may include the sense amplifier 100 of FIG. 1 and may operate based on the operating method of the sense amplifier illustrated in FIG. 2.

As described above, a sense amplifier according to one or more embodiments of the present disclosure may perform a pre-charge operation complying with the FVBP method, by charging first and second bit lines with a first driving voltage being one of driving voltages of a volatile memory device during the pre-charge operation. The sense amplifier may compensate for the offset between first and second MOS transistors included in the sense amplifier during an offset compensation operation. The sense amplifier may increase the sensing sensitivity of the first MOS transistor for data indicating a first logical value during a sensitivity control operation and may sense data stored in a target memory cell by using the first MOS transistor with the increased sensing sensitivity during a pre-sensing operation. Accordingly, according to embodiments of the present disclosure, the sense amplifier, an operating method of the sense amplifier, and a volatile memory device including the sense amplifier advantageously prevents the reduction of sensing sensitivity for data having a specific logical value while compensating for the offset between circuit elements included in the sense amplifier in the volatile memory device to which the FVBP method is applied.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A sense amplifier comprising:
   a sense amplification circuit comprising a first metal-oxide-semiconductor (MOS) transistor connected with a first bit line and a second MOS transistor connected with a second bit line, the first bit line connected with a target memory cell among memory cells, the second bit line connected to a non-target memory cell among the memory cells; and
   a sensitivity control circuit configured to control sensing sensitivity for target data stored in the target memory cell,
   wherein the sense amplification circuit is configured to:
     pre-charge the first and second bit lines with a first driving voltage that is one of driving voltages;
     compensate for an offset between the first and second MOS transistors; and
     perform a sense operation in which the target data based on a change in a voltage level of the first bit line is sensed, and
   wherein the sensitivity control circuit is configured to:
     adjust the sensing sensitivity for the target data indicating a first logical value by increasing a magnitude of a current flowing through the first MOS transistor during the sense operation, and
     increase the sensing sensitivity for the target data by increasing a gate-source voltage of the first MOS transistor or increasing an effective channel width of the first MOS transistor.

2. The sense amplifier of claim 1, wherein the sense amplification circuit is further configured to perform the sense operation after a charge sharing between the target memory cell and the first bit line is performed, and
   wherein the sensitivity control circuit is further configured to adjust the sensing sensitivity for the target data by increasing a gate-source voltage of the first MOS transistor.

3. The sense amplifier of claim 2, wherein the sensitivity control circuit comprises:
   a first variable resistor connected to a source terminal of the first MOS transistor; and
   a second variable resistor connected to a source terminal of the second MOS transistor, and
   wherein the sensitivity control circuit is further configured to, after the charge sharing is performed, adjust the sensing sensitivity by decreasing a resistance value of the first variable resistor.

4. The sense amplifier of claim 2, wherein the sensitivity control circuit comprises:
   a first sensitivity control transistor connected to a source terminal of the first MOS transistor; and
   a second sensitivity control transistor connected to a source terminal of the second MOS transistor, and
   wherein the sensitivity control circuit is configured to, after the charge sharing is performed, increase a gate voltage applied to the first sensitivity control transistor.

5. The sense amplifier of claim 4, wherein the sensitivity control circuit further comprises:
   a first resistor connected between a drain terminal and a source terminal of the first sensitivity control transistor; and
   a second resistor connected between a drain terminal and a source terminal of the second sensitivity control transistor.

6. The sense amplifier of claim 5, wherein the sensitivity control circuit is configured to, after the charge sharing is performed, turn off the second sensitivity control transistor.

7. The sense amplifier of claim 5, wherein the driving voltages include the first driving voltage and a second driving voltage,
   wherein, in response to a determination that the first driving voltage is greater than the second driving voltage, the first logical value corresponds to a logical value of "1", and
   wherein, in response to a determination that the first driving voltage is smaller than the second driving voltage, the first logical value corresponds to a logical value of "0".

8. The sense amplifier of claim 1, wherein the sensitivity control circuit is configured to adjust the sensing sensitivity for the target data by increasing an effective channel width of the first MOS transistor.

9. The sense amplifier of claim 8, wherein the sensitivity control circuit comprises:
   a first sensitivity control transistor connected to a drain terminal of the first MOS transistor;
   a second sensitivity control transistor connected to a drain terminal of the second MOS transistor;
   a first channel expansion transistor including a gate terminal connected with the first bit line and connected between a drain terminal of the first sensitivity control transistor and a source terminal of the first MOS transistor; and a second channel expansion transistor including a gate terminal connected with the second bit line and connected between a drain terminal of the second sensitivity control transistor and a source terminal of the second MOS transistor, and wherein the sensitivity control circuit is configured to, after a charge sharing is performed, increase a gate voltage applied to the first sensitivity control transistor.

10. The sense amplifier of claim 9, wherein the sensitivity control circuit is further configured to, after the charge sharing is performed, turn off the second sensitivity control transistor.

11. The sense amplifier of claim 1, wherein the sense amplification circuit comprises:

a first amplification circuit configured to pre-charge a first sensing bit line, a second sensing bit line, the first bit line, and the second bit line with the first driving voltage based on a first power signal from a first power node;

a second amplification circuit including the first MOS transistor and the second MOS transistor, and configured to sense the target data based on the change in the voltage level of the first bit line;

an offset compensation circuit configured to connect the first sensing bit line with the second bit line and the second sensing bit line with the first bit line, based on an offset compensation signal; and an isolation circuit configured to connect the first sensing bit line with the first bit line and the second sensing bit line with the second bit line, based on an isolation release signal.

12. The sense amplifier of claim 11, wherein the sensitivity control circuit is connected between the sense amplification circuit and a second power node.

13. The sense amplifier of claim 12, wherein the sense amplifier is configured to sequentially perform a pre-sensing operation and a restoring operation after a charge sharing, wherein the isolation release signal maintains a first voltage level during the pre-sensing operation and transitions from the first voltage level to a second voltage level after the pre-sensing operation is completed, and wherein the sense amplifier restores the sensing sensitivity of the first MOS transistor after the pre-sensing operation is completed.

14. An operating method of a sense amplifier, the method comprising:

performing a pre-charge operation such that a first bit line and a second bit line are pre-charged with a first driving voltage being one of driving voltages, wherein the first bit line is connected with a target memory cell among memory cells and the second bit line is complementary to the first bit line and is connected to a non-target memory cell among the memory cells;

performing an offset compensation operation such that an offset between a first metal-oxide-semiconductor (MOS) transistor and a second MOS transistor is compensated, wherein a gate terminal of the first MOS transistor is connected with the first bit line and a gate terminal of the second MOS transistor is connected with the second bit line;

performing a sensitivity control operation such that sensing sensitivity for target data indicating a first logical value stored in the target memory cell is adjusted, wherein the adjusting the sensing sensitivity includes increasing a magnitude of a current flowing through the first MOS transistor; and performing a pre-sensing operation such that the target data are sensed by using the first MOS transistor, wherein the driving voltages include the first driving voltage and a second driving voltage, wherein, in response to a determination the first driving voltage is greater than the second driving voltage, the first logical value corresponds to a logical value of "1", and wherein, in response to a determination the first driving voltage is smaller than the second driving voltage, the first logical value corresponds to a logical value of "0".

15. The method of claim 14, wherein the performing of the sensitivity control operation further comprises performing the sensitivity control operation after a charge sharing operation between the target memory cell and the first bit line, and increasing a gate-source voltage of the first MOS transistor.

16. The method of claim 15, further comprising, after the pre-sensing operation is performed, restoring the sensing sensitivity of the first MOS transistor.

17. The method of claim 14, wherein the performing of the sensitivity control operation further comprises:

increasing an effective channel width of the first MOS transistor.

18. A memory device comprising:

memory cells including a target memory cell and a non-target memory cell;

a first bit line connected with the target memory cell;

a second bit line being complementary to the first bit line and connected with the non-target memory cell; and a sense amplifier configured to sense target data stored in the target memory cell, wherein the sense amplifier comprises:

a sense amplification circuit including a first metal-oxide-semiconductor (MOS) transistor connected with the first bit line and a second MOS transistor connected with the second bit line; and a sensitivity control circuit configured to control sensing sensitivity for the target data, wherein the sense amplification circuit is configured to:

pre-charge the first and second bit lines with a first driving voltage being one of driving voltages of the volatile memory device;

compensate for an offset between the first and second MOS transistors; and after a charge sharing between the target memory cell and the first bit line is performed, perform sense operation in which target data based on a change in a voltage level of the first bit line is sensed, and wherein the sensitivity control circuit is configure figured to:

adjust the sensing sensitivity for the target data indicating a first logical value by increasing a magnitude of a current flowing through the first MOS transistor while the sense amplification circuit senses the target data, and increase the sensing sensitivity for the target data by increasing a gate-source voltage of the first MOS transistor or increasing an effective channel width of the first MOS transistor.

* * * * *